United States Patent
Johnson et al.

(10) Patent No.: US 8,895,673 B2
(45) Date of Patent: Nov. 25, 2014

(54) MACROMONOMERS FOR PREPARATION OF DEGRADABLE POLYMERS AND MODEL NETWORKS

(71) Applicant: The Trustees of Columbia University in the City of New York, New York, NY (US)

(72) Inventors: Jeremiah Johnson, Los Angeles, CA (US); Jeffrey T. Koberstein, Storrs, CT (US); Nicholas J. Turro, Tenafly, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 13/770,373

(22) Filed: Feb. 19, 2013

(65) Prior Publication Data
US 2013/0197164 A1    Aug. 1, 2013

Related U.S. Application Data

(63) Continuation of application No. 12/363,343, filed on Jan. 30, 2009, now Pat. No. 8,378,041, and a continuation of application No. PCT/US2006/041270, filed on Oct. 24, 2006.

(60) Provisional application No. 60/834,501, filed on Aug. 1, 2006.

(51) Int. Cl.
C08F 222/26    (2006.01)
C08F 290/06    (2006.01)
C08G 63/78     (2006.01)
C08F 293/00    (2006.01)
C08F 283/00    (2006.01)

(52) U.S. Cl.
CPC ........... C08F 222/26 (2013.01); C08F 290/061 (2013.01); *C08F 2438/01* (2013.01); C08F 290/06 (2013.01); C08G 63/78 (2013.01); *C08F 293/005* (2013.01); C08F 283/00 (2013.01)
USPC ........... 525/367; 528/363; 526/135; 526/145; 526/146; 526/147; 526/319

(58) Field of Classification Search
CPC .... C08F 222/26; C08F 283/00; C08F 290/06; C08F 293/005; C08F 2438/01; G08G 63/78
USPC .......... 526/135, 145, 146, 147, 319; 534/550; 525/367; 528/363
See application file for complete search history.

(56) References Cited

U.S. PATENT DOCUMENTS 4,722,978 A * 2/1988 Yu ................................. 525/403
5,223,546 A   6/1993 Morita et al.
(Continued)

OTHER PUBLICATIONS

Matyjaszewski et al. "Effect of Initiation Conditions on the Uniformity of Three-Arm Star Molecular Brushes", Macromolecules 2003, vol. 36, No. 6, 1843-1849.*

(Continued)

*Primary Examiner* — Michael M Bernshteyn
(74) *Attorney, Agent, or Firm* — Baker Botts LLP

(57) ABSTRACT

The present invention relates to methods for preparing degradable model networks from any monomer functionality with any degradation methodology. It is based on the use of Atom-Transfer Radical Polymerization and CLICK chemistry to form the desired product.

10 Claims, 12 Drawing Sheets

(56) References Cited

U.S. PATENT DOCUMENTS

Figure 1:
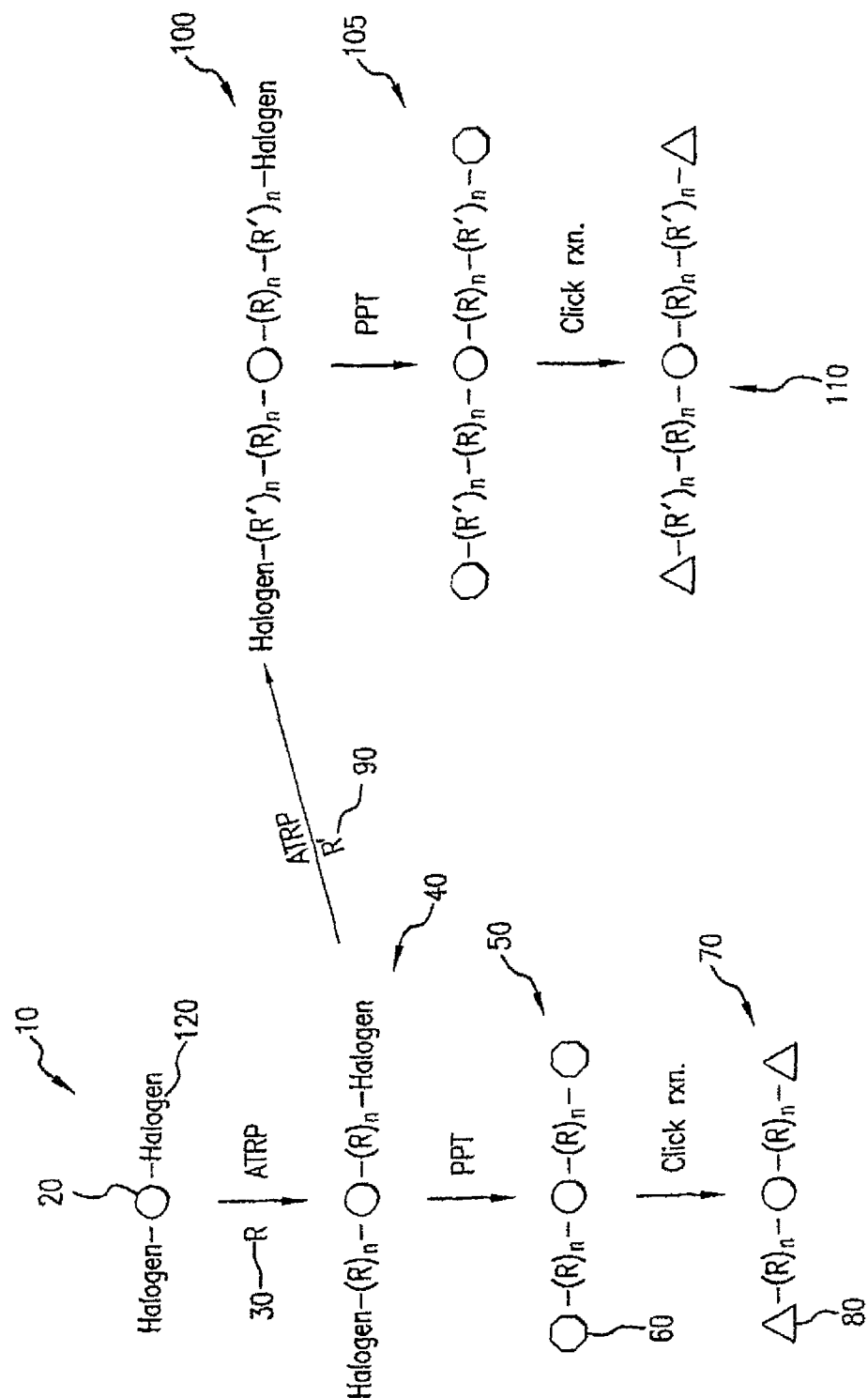

| | | | |
|---|---|---|---|
| 5,238,968 | A | 8/1993 | Morita et al. |
| 5,807,937 | A * | 9/1998 | Matyjaszewski et al. ..... 526/135 |
| 7,795,355 | B2 * | 9/2010 | Matyjaszewski et al. . 525/328.2 |
| 8,378,041 | B2 | 2/2013 | Johnson et al. |

OTHER PUBLICATIONS

U.S. Appl. No. 12/363,343, Jan. 16, 2013 Issue Fee payment.
U.S. Appl. No. 12/363,343, Oct. 17, 2012 Notice of Allowance.
U.S. Appl. No. 12/363,343, Aug. 16, 2012 Response to Non-Final Office Action.
U.S. Appl. No. 12/363,343, Feb. 16, 2012 Non-Final Office Action.
U.S. Appl. No. 12/363,343, Feb. 8, 2012 Response to Restriction Requirement.
U.S. Appl. No. 12/363,343, Sep. 8, 2011 Restriction Requirement.
Bochet, "Photolabile Protecting Groups and Linkers", *Journal of the Chemical Society, Perkins Transactions*, 1(2):125-142 (2002).
Calvo-Flores, et al., "1,3-SDipolar Cycloadditions as a Tool for the Preparation of Multivalent Structures", *Organic Letters*, 2(16):2499-2502 (2000).
Diaz, et al., "Click Chemistry in Materials Synthesis. 1. Adhesive Polymers from Copper-Catalyzed Azide-alkyne Cycloaddition", *Journal of Polymer Science Part A: Polymer Chemistry*, 42(17):4392-4403 (2004).
Flory, "Rubber Elasticity", *Principles of Polymer Chemistry; Cornell Univ. Press*: Ithaca, NY, pp. 432-494 (1953).
Georgiou, et al., "Synthesis, characterization, and Modeling of Double-Hydrophobic Model Networks Based on Cross-Linked Star Copolymers of *n*-Butyl Methacrylate and Methyl Methacrylate", *Macromolecules*, 39:1560-1568 (2006).
Hild, "Model Networks Based on 'Endlinking Processes: Synthesis, Structure and Properties", *Prog. Polym. Sci.*, 23(6):1019-1149 (1998).
Hoffman, "Hydrogels for Biomedical Applications", *Adv. Drug Deliv. Rev.*, 54(1):3-12 (2002).
International Search Report of PCT/US2006/041270, dated May 15, 2007.
Johnson, et al., "Synthesis of Degradable Model Networks Via ATRP and Click Chemistry", *J. Am. Chem. Soc.*, 128(20):6564-6565 (2006).
Johnson, et al., Synthesis of Photocleavable Linear Macromonomers by ATRP and Star Macromonomers by a Tandem ATRP-Click Reaction: Precursors to Photodegradable Model Networks, *Macromolecules*, 40:3589-3598 (2007).
Kafouris et al., "Synthesis and Characterization of Star Polymers and Cross-Linked Star Polymer Model Networks with Cores Based on an Asymmetric, Hydrolyzable Dimethacrylate Cross-Linker", *Chem. Mater.*, 18:85-93 (2006).
Kolb, et al., "Click Chemistry: Diverse chemical Function from a Few Good Reactions", *Angew. Chem., Int. Ed Engl.*, 40:2004-2021 (2001).
Korostova, et al., "Propargyl Ethers of Polyhydric Alcohols", *Zhurnal Prikladnori Khimii* (Sankt-Peterburg, Russian Federation), 63:234-237 (1990).
Matyjaszewski, et al., "The Preparation of Well-Defined Water Soluble-Swellable (Co) Polymers by Atom Transfer Radical Polymerization", *Am. Chem. Soc. Symp. Series*, 765:52-71 (2000).
Matyjaszewski, et al., "Effect of Initiation Conditions on the Uniformity of Three-Arm Star Molecular Brushes", *Macromolecules*, 36(6):1843-1849 (2003).
Osada, et al., "Intelligent Gels: Soft Aggregations of Long-Chain Molecules Can Shrink or Swell in Response to Stimuli. They May Form the Basis of a New Kind of Machine", *Scientific American*, 268(5):82-87 (1993).
Patten, et al., "Atom Transfer Radical Polymerization and the Synthesis of Polymeric Materials", *Advanced Materials*, 10(12):901-915 (1998).
Rostovtsev, et al., "A Stepwise Huisgen Cycloaddition Process: Copper(I)-Catalyzed Regioselective "ligation" of Azides and Terminal Alkynes", *Angew Chem. Int. Ed. Engl.*, 41(14):2596-2599 (2002).
Torne, et al., "Peptidotriazoles on Solid Phase: [1,2,3]-Triazoles by Regiospecific Copper(I)-Catalyzed 1,3-Dipolar Cycloadditions of Terminal Alkynes to Azides", *The Journal of Organic Chemistry*, 67(9):3057-3064 (2002).
Wang, et al., "Controlled/"Living" Radical Polymerization. Atom Transfer Radical Polymerization in the Presence of Transition-Metal Complexes", *J. Am. Chem. Soc.*, 117:5614-5615 (1995).
Xia, et al., "The Effect of Ligands on Copper-Mediated Atom Transfer Radical Polymerization", *Am. Chem. Soc. Symp. Series*, 760:207-23 (2000).

* cited by examiner

MACROMONOMERS FOR PREPARATION OF DEGRADABLE POLYMERS AND MODEL NETWORKS

RELATED APPLICATIONS

The present application is a continuation of U.S. application Ser. No. 12/363,343 filed Jan. 30, 2009 which is a continuation of International Application PCT/US/06/041270 filed Oct 24, 2006 which claims priority to U.S. Provisional Application Ser. No. 60/834,501 filed on Aug. 1, 2006, the contents of which are incorporated herein in their entirety.

GRANT INFORMATION

This invention was made with government support under Grant Nos. DGE-02-21589, DMR-02-13574, DMR-02-14363, and CHE-04-15516 awarded by the National Science Foundation and Grant No. DAAD19-06-0104 awarded by the U.S. Army Research Office. The government has certain rights in the invention.

1. INTRODUCTION

The present invention relates to macromonomers suitable for preparing degradable polymers and model networks, methods for their production, and polymers and polymeric articles fabricated therefrom.

2. BACKGROUND OF THE INVENTION

2.1. Polymer Networks

Synthetic polymer networks have been the subject of extensive theoretical, physical, and chemical study over the past century (i,ii), and are still finding new applications. (iii, iv). The structurally simplest polymer networks are termed "model networks" (MNs) and are typically comprised of linear telechelic, or α,ω-functional, polymers, or macromonomers (MAC), covalently crosslinked through their end groups with multi-functional small molecules. Macromonomers are defined as oligomers with a number average molecular weight $M_n$ between about 1,000 and about 10,000 that contain at least one functional group suitable for further polymerizations. MNs are unique because the crosslink functionality is constant and predetermined, so that the molecular weight between crosslinks is defined by that of the MAC, and the material is homogenous with respect to the crosslink density. (v). Well defined-pore sizes are therefore obtained, providing potential advantages for certain applications. (vi). Although MNs have well-defined structure, they are not considered 'ideal' in a theoretical sense, because they unavoidably contain some number of unreacted functionalities, dangling chains, chain entanglements, and inelastic loops. (v).

Due to their insolubility in all solvents, MNs are notoriously difficult to characterize by common chemical techniques. As a consequence, certain network parameters, like the number of dangling chains, are typically estimated from combining macroscopic measurements (swelling, rheology, etc. . . . ) with theory. Recent research has utilized a hydrolytically labile crosslinker for the degradation of cross-linked star-polymer model networks (CSPMNs), and size exclusion chromatography (SEC) of the degradation products to verify the parent network structure. (iii). However, such CSPMNs have been prepared successfully only through the use of methyl methacrylate (MMA) monomers. If applied to networks of linear MACs, analysis of degradation products can also, in principle, yield the number of dangling chains after subtracting out the sol portion.

Recently, the development of a controlled/"living" free radical polymerization technique known as Atom Transfer Radical Polymerization (ATRP), described in Wang, J-S, and Matyjaszewski, K., *Journal of the American Chemical Society*, Vol, 117 (1995), p. 5641, has rendered possible the synthesis of a variety of well-defined polymers with low polydispersity indexes ($M_w/M_n$, <13, where $M_w$, is the weight average molecular weight) and predetermined molecular weights, defined by the relationship $DP=\Delta[M]/[I]_0$, where DP is the degree of polymerization, [M] is the reacted monomer concentration, and $[I]_0$ is the initial concentration of the initiator. The mechanism of ATRP, shown in Scheme 1 below, is believed to be based on the repetitive addition of a monomer M to growing radicals R• generated from alkyl halides R—X by a reversible redox process. This process is catalyzed by transition metal compounds, especially cuprous (Cu(I)) halides, complexed by suitable ligands such as bipyridines and bi-, tri- and tetradentate amines, as described in Xia, J. Zhang, X. and Matyjaszewski, K., *American Chemical Society Symposium Series*, Vol. 760 (2000), pp. 207-23. The rate of monomer addition is dependent on the equilibrium constant between the activated (Cu(I)) and deactivated (Cu(II)) species. By maintaining a low concentration of active radicals, slow growth of the molecular weight is promoted and the "living" ATRP process is controlled. The degree of polymerization is determined by the ratio of reacted monomer concentration to initiator concentration ($DP_n=\Delta[M]/[R—X]_0$).

Scheme 1: Mechanism of ATRP

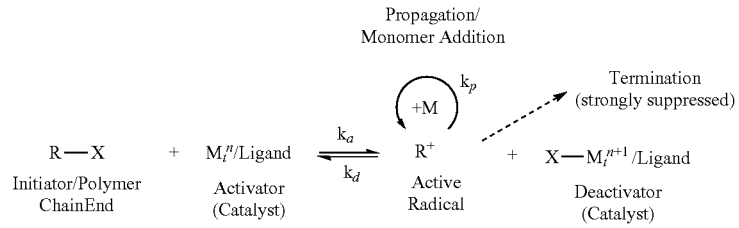

Radical reactions allow for polymerization of a large variety of vinyl monomers and are tolerant to many functional groups. ATRP is applicable to the reactions of hydrophobic monomers such as acrylates, methacrylates and styrene, as shown in Patten, T, E. and Matyjaszewski, K. *Advanced Materials*, Vol. 10 (1998), pp. 901-915, and also of hydrophobic and functional monomers such as 2-hydroxyethyl acrylate, 2-hydroxyethyl methacrylate, 2-(dimethylamino) ethyl methacrylate (DMAEMA) and 4-vinylpyridine. See Matyjaszewski, K., Gaynor, S. G., Qiu, J., Beers, K., Coca, S., Davis, K., Muhlebach, A., Xia, J., and Zhang, X., *American Chemical Society, Symposium Series*, Vol. 765 (2000), pp. 52-71.

Further, researchers have recently reported the copper (I) catalyzed azide-alkyne cycloaddition (CuAAC) reaction (vii, viii), which has emerged as the best example of "click chemistry," (ix) characterized by extraordinary reliability and functional group tolerance. This ligation process has proven useful for the synthesis of model polymers and materials in many situations.

2.2. Degradable Polymers

A degradable polymer is a polymer that contains a cleavage site, a bond in the chemical structure that will cleave under certain conditions. Degradable polymers have many applications, such as drug delivery, medical devices, environmentally-friendly plastics, and temporary adhesives or coatings. A variety of natural and synthetic polymers are degradable. Generally, a polymer based on a C—C backbone tends to be non-degradable, while heteroatom-containing polymer backbones are degradable. Degradability can therefore be engineered into polymers by the addition of chemical linkages such as anhydride, ester, or amide bonds, among others.

Biodegradable polymers with hydrolyzable chemical bonds have been the subject of extensive research. Polymers based on polylactide (PLA), polyglycolide (PGA), polycaprolactone (PCL) and their copolymers have been extensively employed as biodegradable materials. Degradation of these materials yields the corresponding hydroxyacids, making them safe for in vivo use.

Photodegradable polymers can be created by the addition of photosensitive groups (promoters) to the polymer. Two common promoters are carbonyl groups and metal complexes, which cleave when exposed to sufficient ultraviolet radiation, such as that present in sunlight. However, metals left behind by cleavage of these heavy metal complexes can cause environmental problems in sufficient quantities.

Degradable model networks in particular have many potential applications, yet in order to be successfully used, a method of yielding MACs of low polydispersity that possess orthogonal crosslinking and various degradation functionalities is necessary.

3. SUMMARY OF THE INVENTION

The present invention relates to macromonomers suitable for preparing degradable polymers and model networks, methods for their production, and polymers and polymeric articles fabricated therefrom. It is based, at least in part, on the discovery that ATRP can be used to synthesize macromonomers of low polydispersity that possess orthogonal crosslinking and degradation functionalities. Such macromonomers include, in non-limiting embodiments, both α,ω-difunctional and heterobifunctional macromonomers, and star polymer macromonomers, all of which are preferably rendered degradable through the incorporation of various degradation functionalities as taught by the inventive method.

The present invention further provides for a wide variety of articles fabricated from materials comprising the macromonomers of the invention, including polymer model networks, hydrogels, drug delivery vehicles, tissue scaffolding, cosmetics, bags, films, surface modification agents, contrast agents, and nanoparticles.

4. BRIEF DESCRIPTION OF THE FIGURES

FIG. 1. Schematic of α,ω-Difunctional Macromonomer Synthesis.

Figure 2:
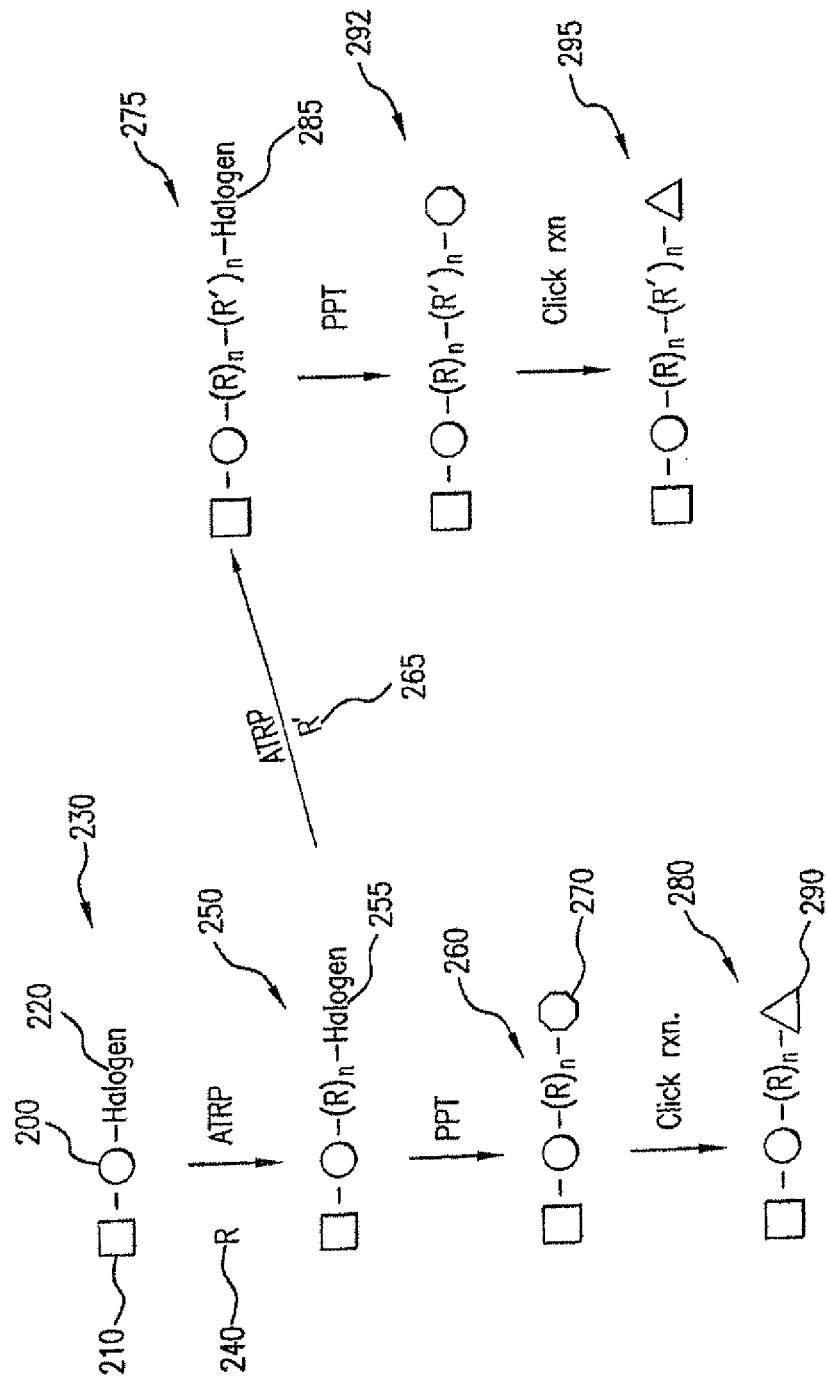

FIG. 2. Schematic of Heterobifunctional Macromonomer Synthesis.

Figure 3:
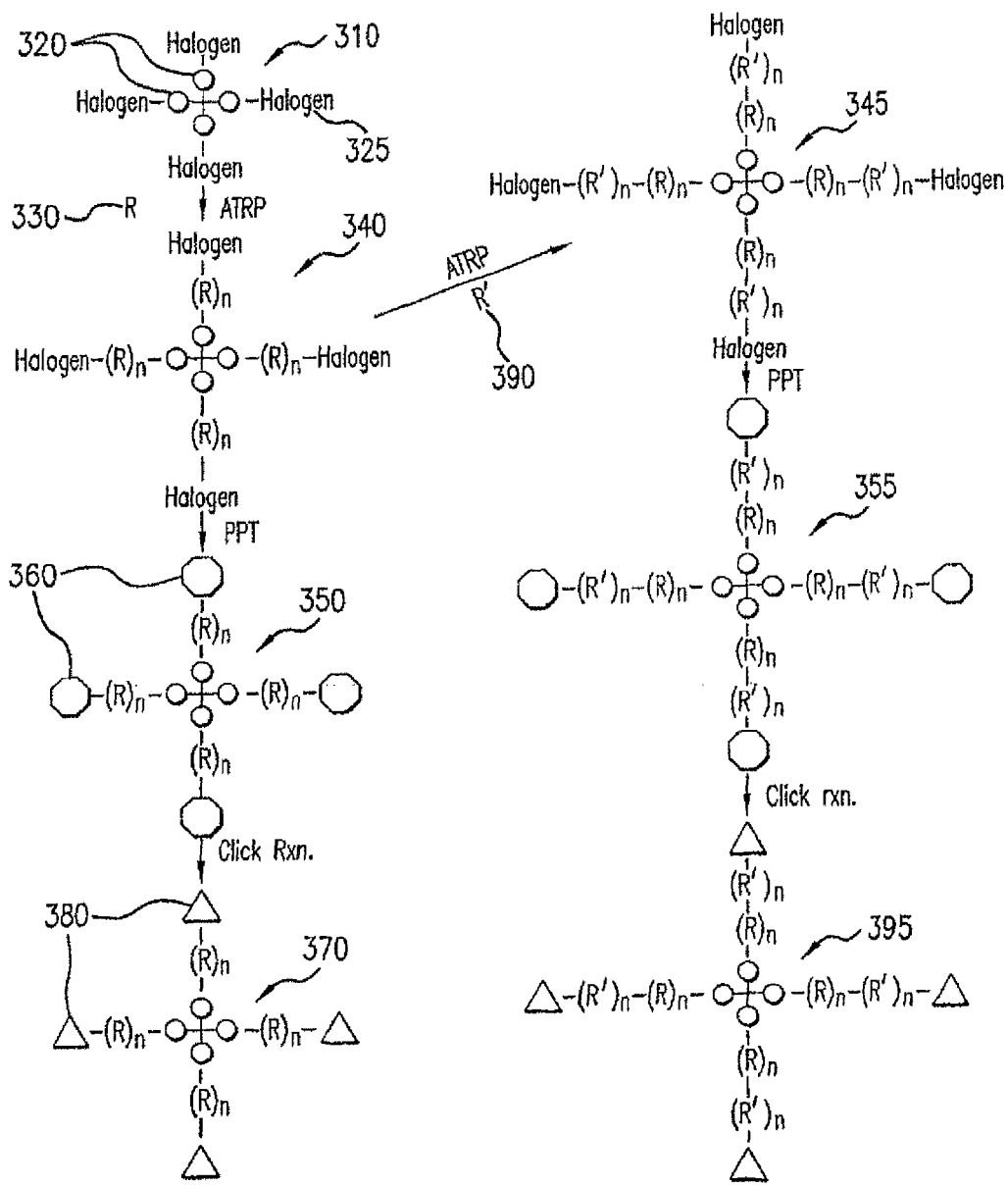

FIG. 3. Schematic of Star Polymer Macromonomer Synthesis.

Figure 4:
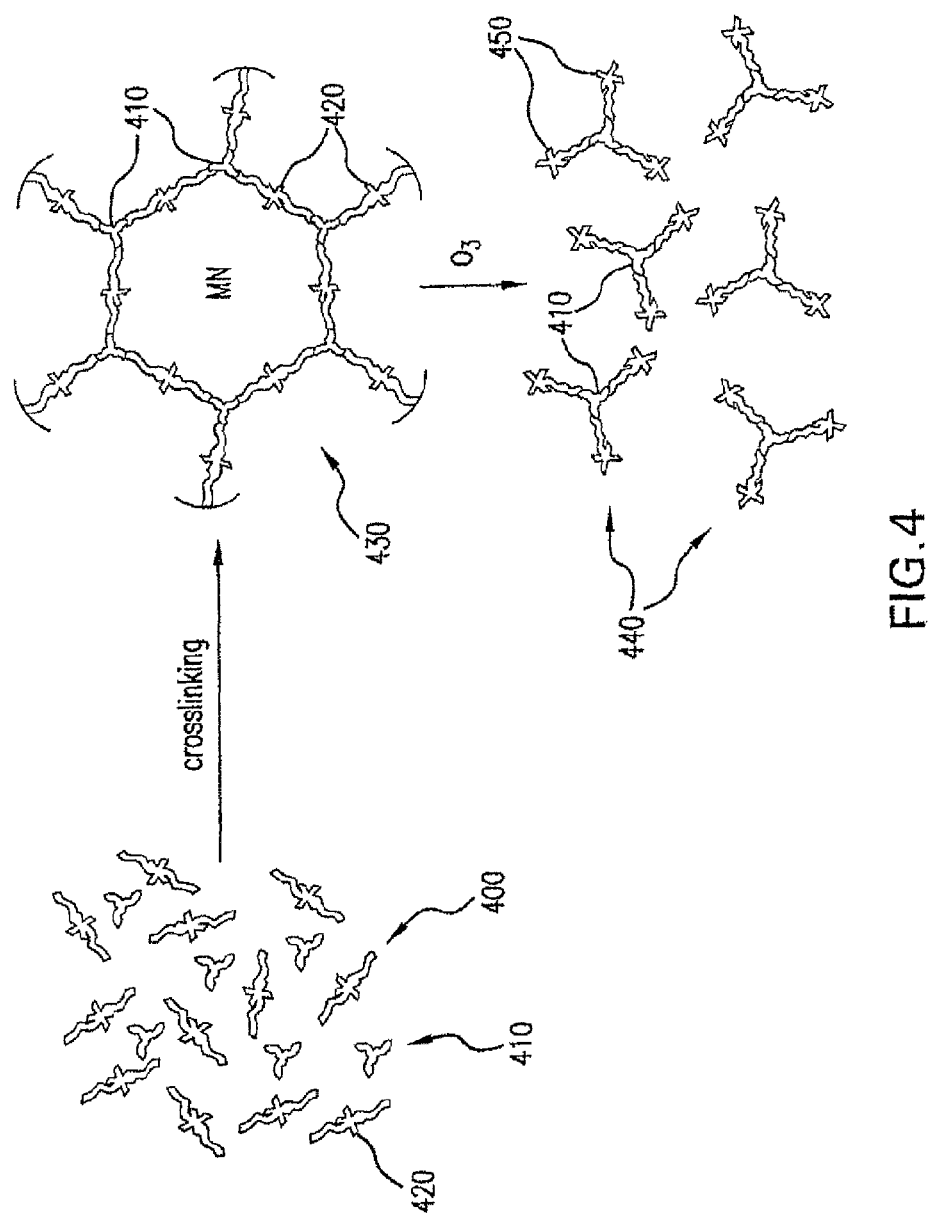

FIG. 4. Schematic of ozonolyzable Model Network synthesis and degradation.

Figure 5:
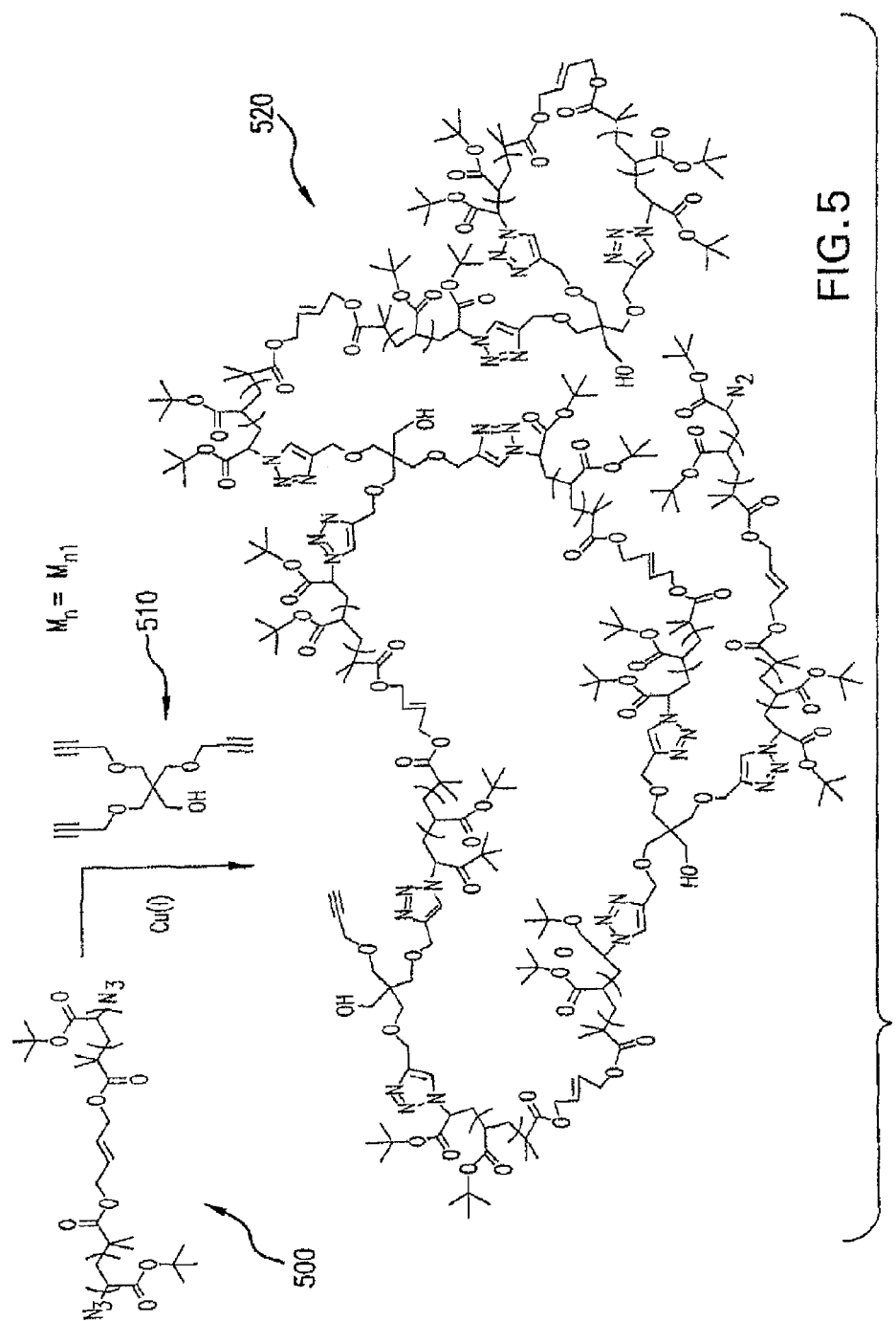
Figure 5:
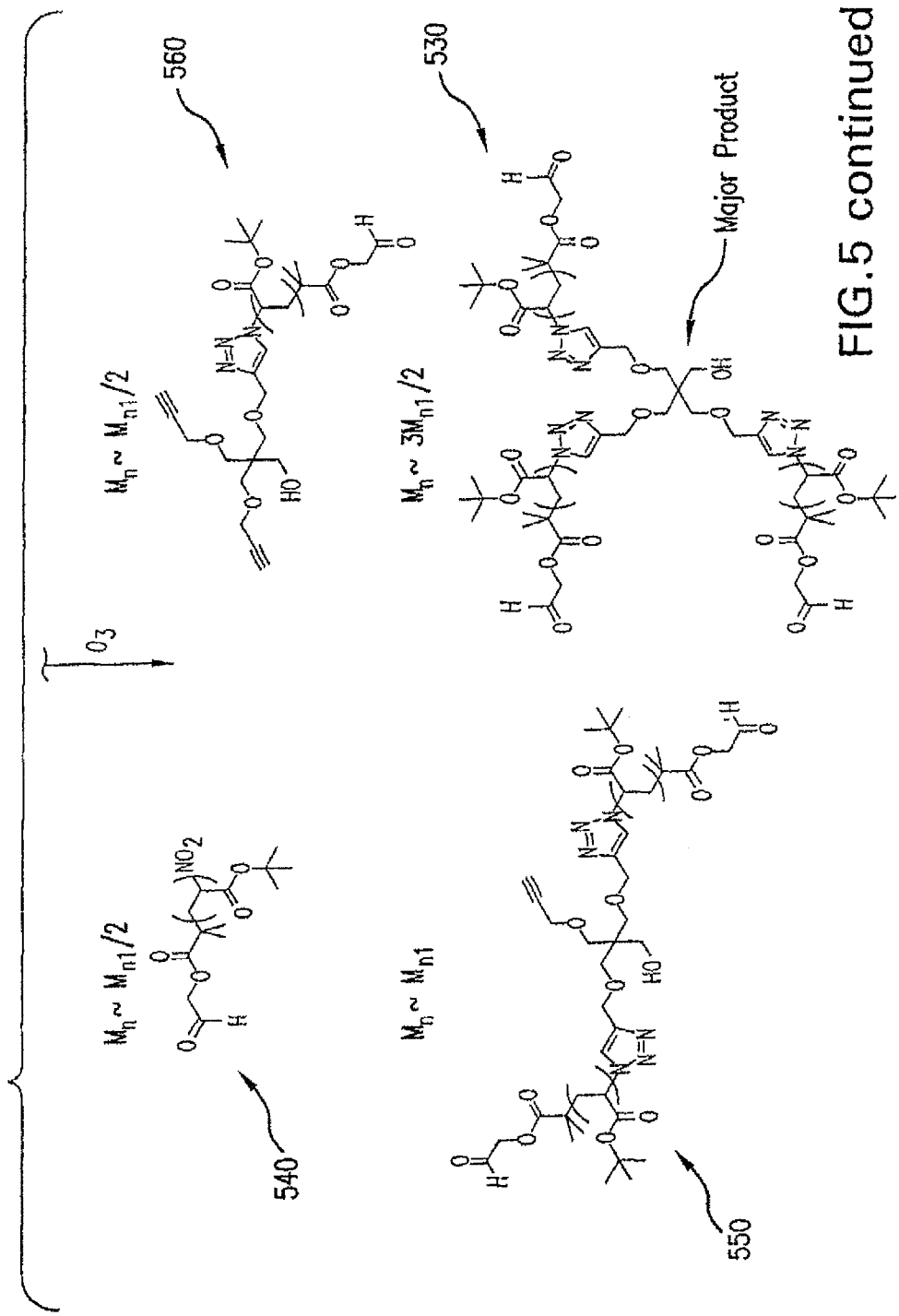

FIG. 5. Hypothesized Molecular structure of ozonolyzable Model Network, MAC, and degradation products.

Figure 6:
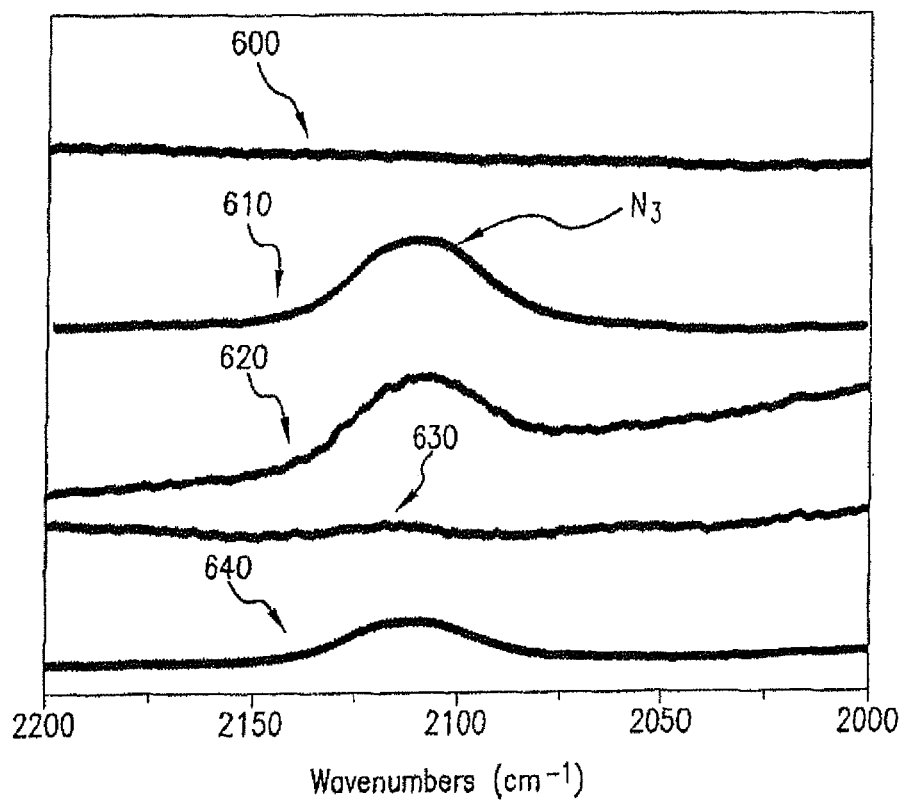

FIG. 6. IR spectra of (from top to bottom) α,ω-bromo-poly (tert-butyl acrylate), 1, control crosslinking reaction without copper, 1:1 azide:alkyne MN, and 2:1 azide:alkyne MN in the azide stretch region (~2100 cm$^{-1}$).

Figure 7:
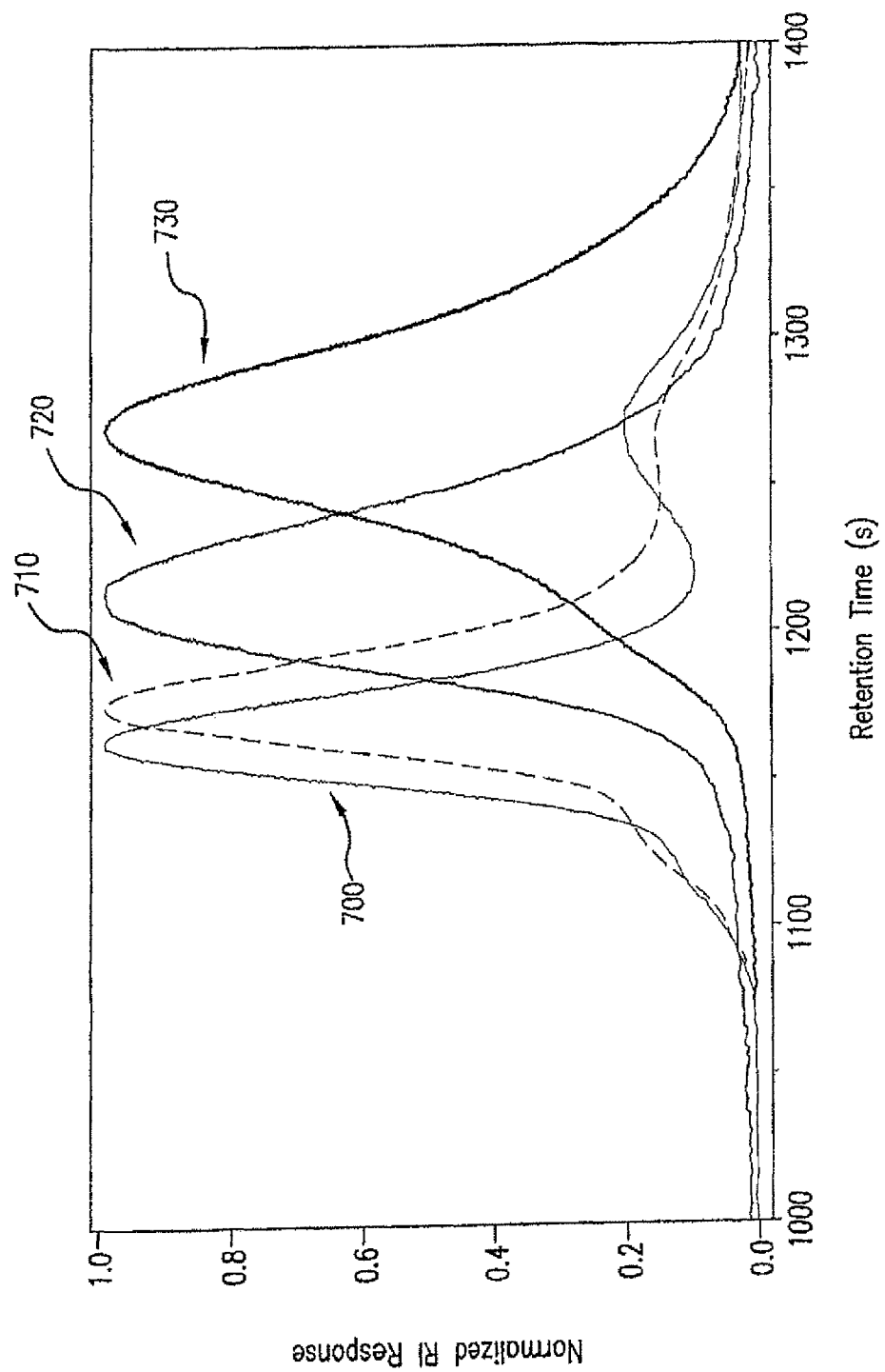

FIG. 7. SEC chromatograms of MAC 1 before and after ozonolysis and the ozonolysis products of MNs 1a and 1b.

Figure 8:
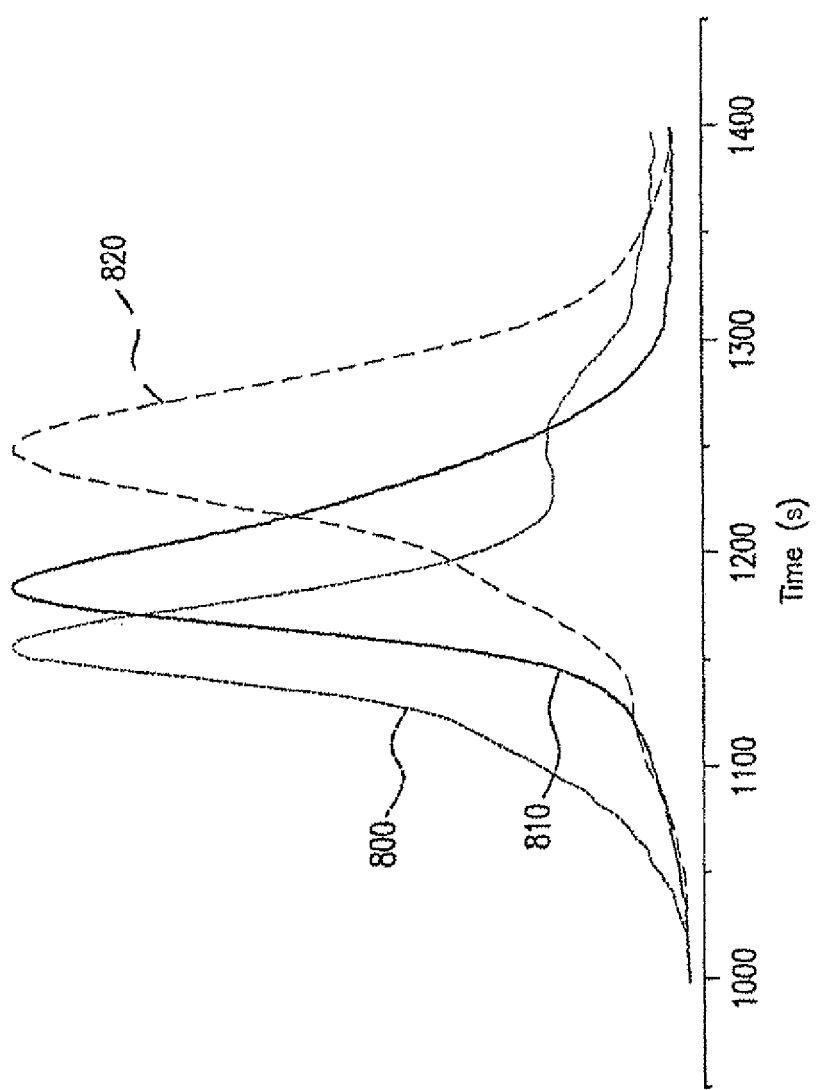

FIG. 8. SEC chromatograms of MAC 2, MAC 2 after photocleavage, and degradation product 4.

Figure 9:
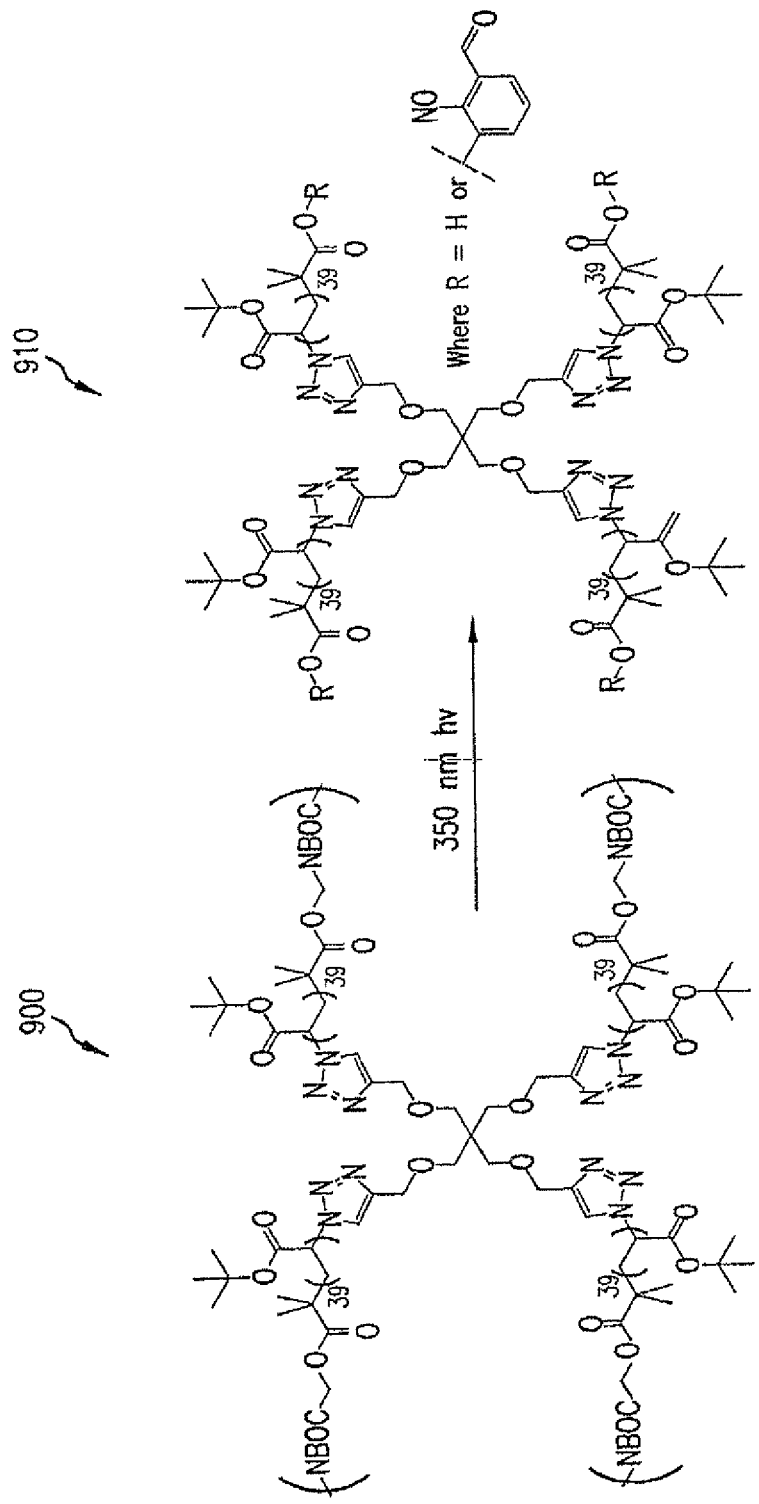

FIG. 9. Hypothesized Molecular structure of photodegradable Model Network, and resulting degradation product.

Figure 10:
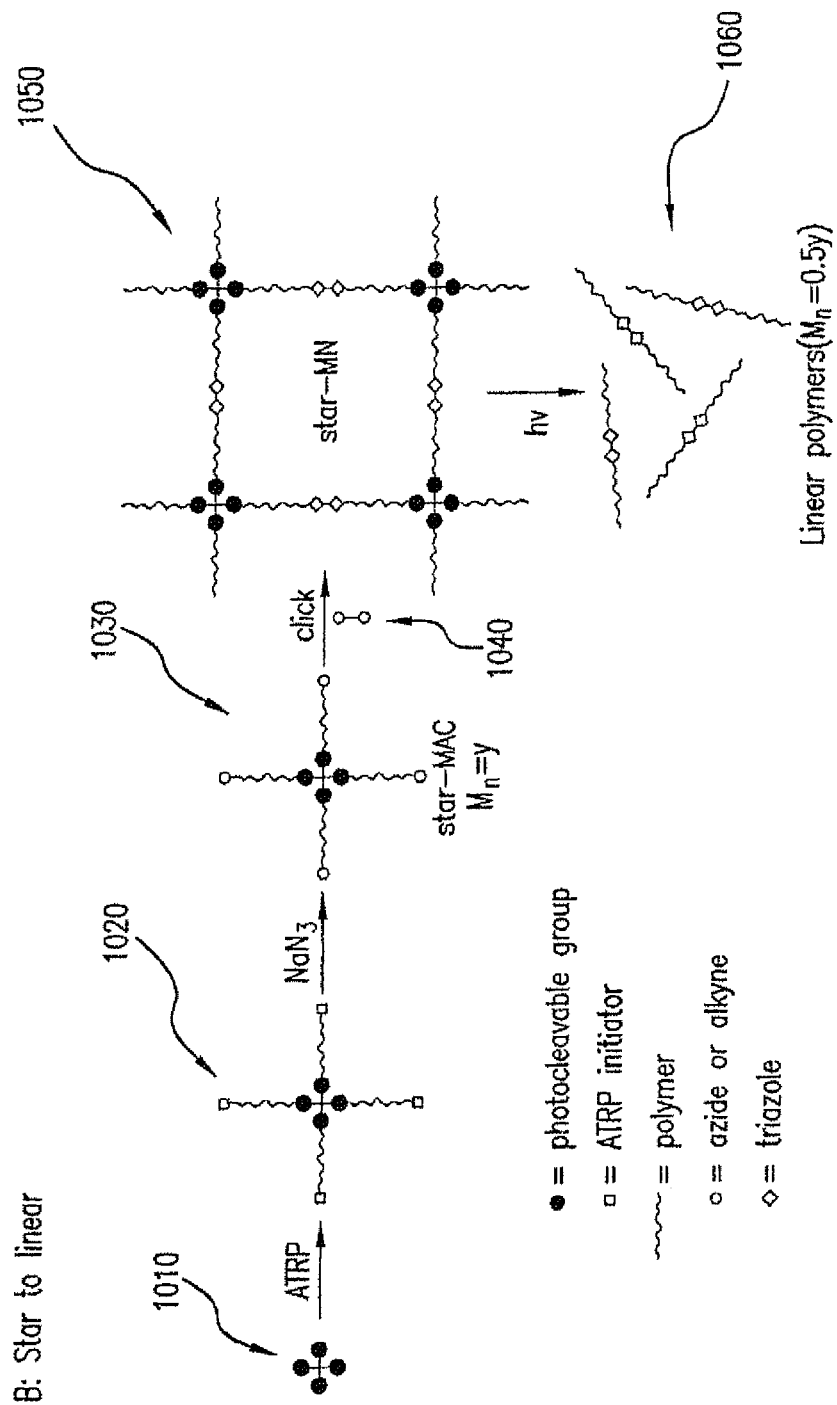

FIG. 10. Schematic of photodegradable Model Network synthesis from star polymer macromonomers and degradation.

Figure 11:
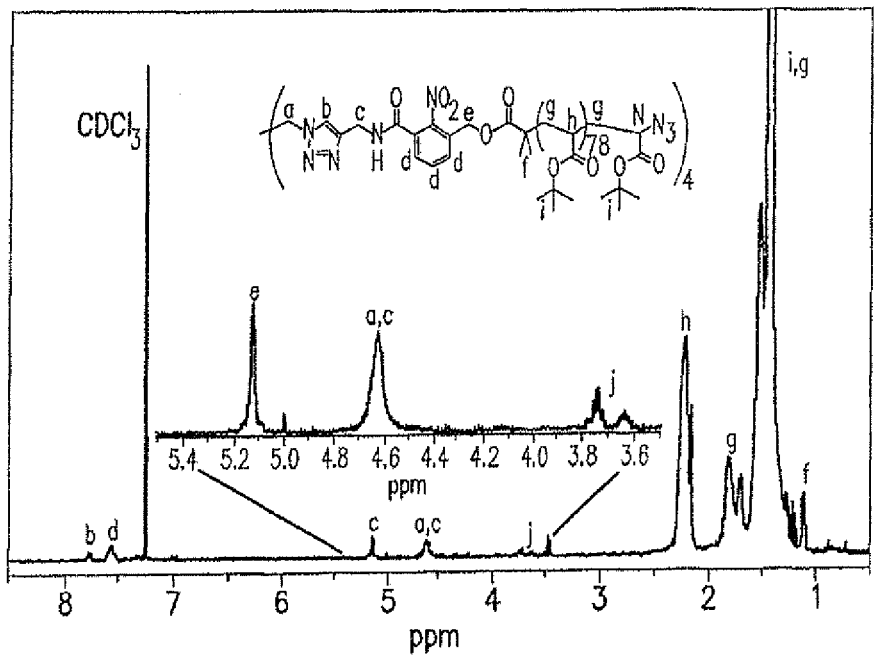

FIG. 11. $^1$H NMR resonances of MAC 17.

Figure 12:
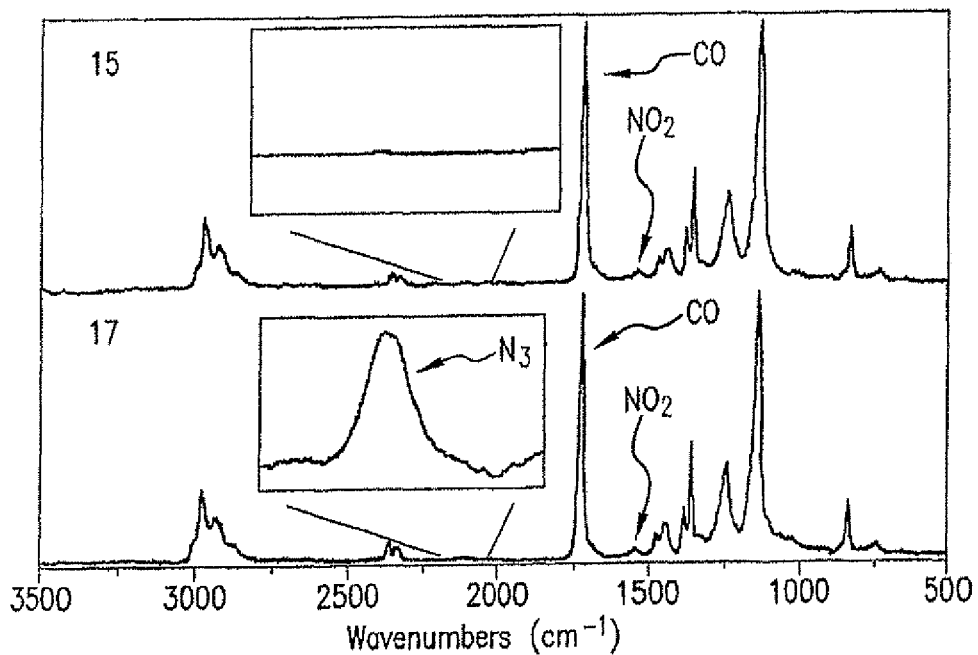

FIG. 12. FTIR spectra of 4-arm ptBA star polymer 15 and MAC 17.

5. DETAILED DESCRIPTION OF THE INVENTION

For clarity, and not by way of limitation, the detailed description of the invention is divided into the following subsections:

(5.1) Difunctional Macromonomer Synthesis;
(5.2) Heterobifunctional Macromonomer Synthesis;
(5.3) Star Polymer Macromonomer Synthesis;
(5.4) Uses of the Invention 5.1 α,ω-Difunctional Macromonomer Synthesis In one set of embodiments, the present invention provides for a method of synthesizing α,ω-difunctional macromonomers with a general structure of C—(R)$_n$-L-(R)$_n$—C and α,ω-difunctional block macromonomers with a general structure of C—(R')$_n$—(R)$_n$-L-(R)$_n$—(R')$_n$—C. "L" is a linker, chosen from the group consisting of non-degradable, photodegradable, ozonolyzable, biodegradable, or hydrolyzable. "R" is a monomer, selected from the group consisting of acrylates, methacrylates, styrenics, and polyacids. "R'" is a monomer, different from "R," selected from the group consisting of acrylates, methacrylates, styrenics, and polyacids. "n" is a variable representing the number of monomers in the macromonomer, and is chosen such that the macromonomer has a molecular weight between about 1,000 and 10,000. "C" is a terminal functional group, chosen from the group consisting of hydroxyl, allyl, acrylate, or azide.

As shown in FIG. 1, synthesis begins with a bifunctional polymerization initiator (10) containing a linker "L" (20), represented as a circle. The linker "L" (20) may be non-degradable, but may also include photodegradable, ozonolyzable, biodegradable or hydrolyzable linkages. As examples, an ozonolyzable linker may include an olefin moiety, while a photodegradable linker may include a nitrobenzylcarbonyl moiety. A biodegradable linker may include a peptide bond, while hydrolyzable linkers may include ester linkages.

The initiator (10) is bifunctional, containing terminal halogen groups (120) as initiation sites for polymerization. Bromine is especially suited for such use as an initiation site for ATRP reactions. Specific, non-limiting examples of initiator (10) are 1,2-bis(bromoisobutyryloxy)-2-butene (Compound 4) described in Section 6 below, and the novel bifunctional nitrobenzyloxycarbonyl (NBOC) initiator (1) described in Section 7 below.

The initiator (10) is then reacted with a sufficient amount of a chosen monomer "R" (30) through ATRP to form a macromonomer (40), an oligomer with a number average molecular weight $M_N$ between about 1,000 and about 10,000. The monomer "W" (30) can include acrylates, methacrylates, styrenics, and polyacids. However, due to ATRP's sensitivity to the presence of acid functionalities, in order to polymerize polyacid monomers, monomers with protected acid groups must be polymerized followed by a deprotection step to regenerate the desired acid functionality. If an α,ω-difunctional block macromonomer (110 or 105) is desired, the ATRP step is repeated using a different monomer base "R'" (90), such that the resulting oligomer has a $M_N$ between about 1,000 and about 10,000. The resulting macromonomers (100) and (40) are polymeric halides, A specific, non-limiting example of macromonomer (40) is α,ω-bromo-poly(tert-butyl acrylate) (Compound 5), described in Section 6 below.

The description will be continued now with respect to synthesis of an α,ω-difunctional macromonomer (50 or 70). Synthesis of an α,ω-difunctional block macromonomer is conducted using similar steps. In order to continue synthesis, the terminal halogen groups of the resulting polymeric halide (40) can be converted via a post-polymerization transformation (PPT) to a hydroxyl, allyl, acrylate, or azide functional group "C" (60), represented as an octagon, forming an α,ω-difunctional macromonomer (50). Hydroxyl groups may be added by treating the halide (40) with 4-aminobutanol in dimethylformamide (DMF), while allyl groups may be added by treating the halide (40) with allyltributyltin. Azide groups are especially suited for the CuAAC "click chemistry" reaction, and may be added by treating the halide (40) with sodium azide in DMF. Following addition of a terminal azide group, further terminal functional groups (80), represented as triangles, may be added, including aldehyde, hydroxy, carboxy, amine, peptide, epoxide, or thiol groups, through click reactions of the resulting terminal azide (60) with functional alkyne, norbornadiene, or cyclooctyne. Use of a functional alkyne requires a copper catalyst, while use of a functional cyclooctyne does not require a copper catalyst and is thus better suited for biomedical applications. The ability to add various terminal functional groups allows the user to choose the cure chemistry that may be utilized later to crosslink the linear macromonomers to form a polymer MN. Specific non-limiting examples of such polymer MNs that may be formed are MNs 1a, 1b, and 3, described in Sections 6 and 7 below. Specific non-limiting examples of crosslinkers that may be used are CLa and CLb, described in Section 6 below. If the click chemistry process is chosen for crosslinking, subsequent to crosslinking, unreacted terminal azide groups may also be replaced with similar terminal functional groups. Specific, non-limiting examples of α,ω-difunctional macromonomer (50) are MAC 1, described in Section 6 below, and MAC 2, described in Section 7 below, 5.2 Heterobifunctional Macromonomer Synthesis In further non-limiting embodiments, the present invention provides for a method of synthesizing Heterobifunctional Macromonomers with a general structure of E-L-(R)$_n$—C and Heterobifunctional Block Macromonomers with a general structure of E-L-(R)—(R')$_n$—C. "E" is a terminal functional group, chosen from the group consisting of hydroxyl, allyl, acrylate, or alkyne. "L" is a linker, chosen from the group consisting of non-degradable, photodegradable, ozonolyzable, biodegradable, or hydrolyzable. "R" is a monomer, selected from the group consisting of acrylates, methacrylates, styrenics, and polyacids. "R'" is a monomer, different from "R," selected from the group consisting of acrylates, methacrylates, styrenics, and polyacids. "n" is a variable representing the number of monomers in the macromonomer, and is chosen such that the macromonomer has a molecular weight between about 1,000 and 10,000. "C" is a terminal functional group, chosen from the group consisting of hydroxyl, allyl, acrylate, or azide.

As shown in FIG. 2, synthesis begins with a heterobifunctional polymerization initiator (230) containing a linker "L" (200), represented as a circle. Linker "L" (200) may be non-degradable, but may also include photodegradable, ozonolyzable, biodegradable, or hydrolyzable linkages. As examples, an ozonolyzable linker may include an olefin moiety, while a photodegradable linker may include a nitrobenzylcarbonyl moiety. A biodegradable linker may include a peptide bond, while hydrolyzable linkers may include ester linkages.

The initiator (230) is heterobifunctional, containing one terminal halogen group (220) as an initiation site for polymerization, and a functional end group "E" (210) that may be a hydroxyl, allyl, acrylate, or alkyne group. Bromine is especially suited for such use as an initiation site for ATRP reactions.

The initiator (230) is then reacted with a chosen monomer "R" (240) through ATRP to form a macromonomer (250), an oligomer with a number average molecular weight $M_N$ between about 1,000 and about 10,000. The monomer "R" (240) can include acrylates, methacrylates, styrenics, and polyacids. However, due to ATRP's sensitivity to the presence of acid functionalities, in order to polymerize polyacid monomers, monomers with protected acid groups must be polymerized followed by a deprotection step to regenerate the desired acid functionality. If a heterobifunctional block macromonomer (295 or 292) is desired, the ATRP step is repeated using a different monomer base, "R'" (265), such that the resulting oligomer has a $M_N$ between about 1,000 and about 10,000. The resulting macromonomers (275) and (250) are polymeric halides that contain terminal halogen groups (255) and (285) at the end of a polymer chain on one end of the linkage (200), and the original functional group (210) on the other end.

The description will be continued now with respect to synthesis of a heterobifunctional macromonomer (260 or 280). Synthesis of a heterobifunctional block macromonomer is conducted using similar steps. In order to continue synthesis, the terminal halogen group (255) of the resulting polymeric halide (250) can be converted via a post-polymerization transformation (PPT) to a hydroxyl, allyl, acrylate, or azide functional group "C" (270), represented as an octagon, forming a heterobifunctional macromonomer (260). Hydroxyl groups may be added by treating the halide (250) with 4-aminobutanol in DMF, while allyl groups may be added by treating the halide (250) with allyltributyltin. Azide groups are especially suited for the CuAAC "click chemistry" reaction, and may be added by treating the halide (250) with sodium azide in DMF. Following addition of a terminal azide group, a further terminal functional end group (290), represented as a triangle, may be added, including aldehyde, hydroxy, carboxy, amine, peptide, epoxide, or thiol groups through click reactions of the resulting terminal azide with functional alkyne, norbornadiene, or cyclooctyne. Use of a functional alkyne requires a copper catalyst, while use of a functional cyclooctyne does not require a copper catalyst and is thus better suited for biomedical applications. The ability to add various terminal functional groups allows the user to choose the cure chemistry that may be utilized later to crosslink the linear macromonomers to form a polymer MN.

Specific non-limiting examples of crosslinkers that may be used are crosslinkers CLa and CLb, described in Section 6 below. If the click chemistry is chosen for crosslinking, subsequent to crosslinking, unreacted terminal azide groups may also be replaced with similar terminal functional groups.

5.3 Star Polymer Macromonomer Synthesis

In one set of embodiments, the present invention provides for a method of synthesizing star polymer macromonomers with a general structure of:

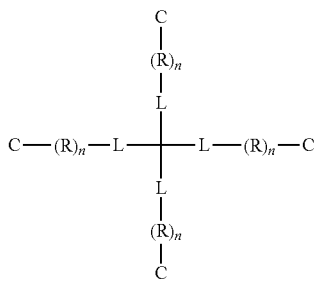

and star polymer block macromonomers with a general structure of:

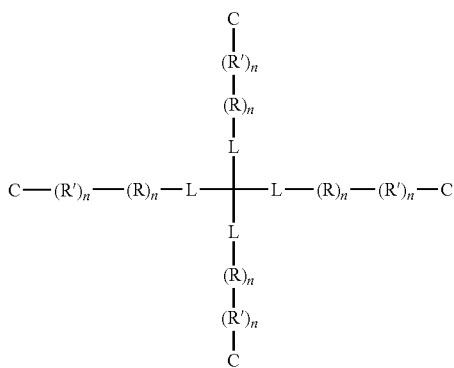

"L" is a linker, chosen from the group consisting of non-degradable, photodegradable, ozonolyzable, biodegradable, or hydrolyzable. "R" is a monomer, selected from the group consisting of acrylates, methacrylates, styrenics, and polyacids, "R'" is a monomer, different from "R," selected from the group consisting of acrylates, methacrylates, styrenics, and polyacids. "n" is a variable representing the number of monomers in the macromonomer, and is chosen such that the macromonomer has a molecular weight between about 4,000 and 40,000. "C" is a terminal functional group, chosen from the group consisting of hydroxyl, allyl, acrylate, or azide.

As shown in FIG. 9, synthesis begins with a tetrafunctional polymerization initiator (310) containing a linker "L" (320), represented as a circle, for each initiation site. The linker "L" (320) may be non-degradable, but may also include photodegradable, ozonolyzable, biodegradable or hydrolyzable linkages. As examples, an ozonolyzable linker may include an olefin moiety, while a photodegradable linker may include a nitrobenzylcarbonyl moiety. A biodegradable linker may include a peptide bond, while hydrolyzable linkers may include ester linkages.

The initiator (310) is tetrafunctional, containing four terminal halogen groups (325) as initiation sites for polymerization. Bromine is especially suited for such use as an initiation site for ATRP reactions.

The initiator (310) is then reacted with a sufficient amount of a chosen monomer "R" (330) through ATRP to form a star polymer macromonomer (340), an oligomer with a number average molecular weight $M_N$ between about 1,000 and about 10,000. The monomer "R" (330) can include acrylates, methacrylates, styrenics, and polyacids. However, due to ATRP's sensitivity to the presence of acid functionalities, in order to polymerize polyacid monomers, monomers with protected acid groups must be polymerized followed by a deprotection step to regenerate the desired acid functionality. If a star polymer block macromonomer (355 or 395) is desired, the ATRP step is repeated using a different monomer base "R'" (390), such that the resulting oligomer has a M between about 4,000 and about 40,000. The resulting star polymer macromonomers (340) and (345) are polymeric halides. A specific, non-limiting example of macromonomer (340) is ptBA star polymer 15, described in Section 7b below.

The description will be continued now with respect to synthesis of a star polymer macromonomer (350 or 370). Synthesis of a star polymer block macromonomer is conducted using similar steps. In order to continue synthesis, the terminal halogen groups of the resulting polymeric halide (340) can be converted via a post-polymerization transformation (PPT) to hydroxyl, allyl, acrylate, or azide functional groups "C" (360), represented as octagons, forming a star polymer macromonomer (350). Hydroxyl groups may be added by treating the halide (340) with 4-aminobutanol in dimethylformamide (DMF), while allyl groups may be added by treating the halide (340) with allyltributyltin. Azide groups are especially suited for the CuAAC "click chemistry" reaction, and may be added by treating the halide (340) with sodium azide in DMF. Following addition of a terminal azide group, further terminal functional groups (380), represented as triangles, may be added, including aldehyde, hydroxy, carboxy, amine, peptide, epoxide, or thiol groups, through click reactions of the resulting terminal azide (360) with functional alkyne, norbornadiene, or cyclooctyne. Use of a functional alkyne requires a copper catalyst, while use of a functional cyclooctyne does not require a copper catalyst and is thus better suited for biomedical applications. The ability to add various terminal functional groups allows the user to choose the cure chemistry that may be utilized later to crosslink the star polymer macromonomers to form a polymer MN. A specific non-limiting example of such polymer MNs that may be formed is MN 19, described in Section 7b below. A specific non-limiting example of a crosslinker that may be used is Compound 18, described in Section 7b below. If the click chemistry process is chosen for crosslinking, subsequent to crosslinking, unreacted terminal azide groups may also be replaced with similar terminal functional groups. A specific, non-limiting example of star polymer macromonomer (350) is MAC 17, described in Section 7b below.

5.4 Uses of the Invention

The macromonomers of the present invention may be used to produce cross-linked polymer model networks, gels, and hydrogels. Hydroxy-terminated macromonomers allow use of a polyurethane cure, while amine-terminated macromonomers allow an epoxide/polyurethane cure. Alkene-terminated macromonomers allow a free-radical/hydrosilylation cure, while epoxide-terminated macromonomers allow an amine cure, and thiol-terminated macromonomers allow a disulfide/vulcanization cure. Alkyne-terminated macromonomers allow a hydrosilylation/azide cure, while azide-terminated macromonomers allow an alkyne/Diels-Alder cure. The ability to select the cure chemistry desired allows the user to tailor such macromonomers to their expected environment. Such materials have a broad range of applications, including cosmetics such as nail polish, biomedical products such as degradable hydrogels or tissue scaffolding, consumer products such as degradable bags or films, and pharmaceutical products such as drug delivery vehicles. Macromonomers are also useful as surface modification agents, contrast agents, and nanoparticles.

6. EXAMPLE—PREPARATION AND DEGRADATION OF OZONOLYZABLE MODEL NETWORK

General

With reference to FIG. 4, this scheme was employed to prepare the first tert-butyl acrylate based MNs (1a, 1b) (430) comprised of an α,ω-azido-poly(tBA) MAC (1) (400) crosslinked with tri- (410) and tetra- (not shown) acetylene crosslinkers (a and b respectively). After synthesis, the olefin moiety (420) at the center of the MAC (400) was cleaved through ozonolysis to form tri-armed polymers (440) with aldehyde terminal groups (450).

All reagents were purchased from Aldrich chemical company and were used as supplied unless otherwise noted. Tert-butyl acrylate was distilled under reduced pressure over CaH prior to use. Toluene and N,N,N',N'',N'''-pentamethyldiethylenetriamine (PMDETA) were degassed with argon for 20 m prior to use. Crosslinkers 2,2,2-tris(2-propynyloxymethyl)ethanol (CLa) and tetrakis(2-propynyloxymethyl)methane (CLb) were prepared according to literature procedures. (x, xi, xii). SEC measurements were performed on a Knauer GPC system with a Knauer K-2301 refractive index detector and a Spark Holland Basic Marathon autosampler. Three Polymer Laboratories 5 μm particle size PLgel columns (one 100 Å and two MIXED-D pore types) placed in series were employed for the chromatography. The system was calibrated against linear polystyrene standards ranging in molecular weight from 580-377,400 Da. Experiments were performed at room temperature in THF eluant with a flow rate of 1.0 mL/min. Ozone for degradation studies was generated from an Ozone Lab OL100 Ozone Generator.

Synthesis of 1,2-bis(bromoisobutyryloxy)-2-butene (Compound 4)

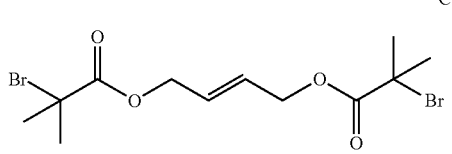

Compound 4

Triethylamine (1.20 g, 11.8 mmol) was added to a round-bottom flask containing 2-butene-1,4-diol (0.454 g, 5.15 mmol) and tetrahydrofuran (THF, 30 mL). This solution was added dropwise to a stirring solution of α-bromoisobutyryl bromide (2.60 g, 1.40 mL) in THF (25 mL) at 0° C. A white precipitate formed immediately. The mixture was stirred for 2 h at 0° C. followed by overnight stirring at room temperature. After this time, the reaction mixture was filtered, condensed on a rotary evaporator, diluted with ethyl acetate (EtOAc, 50 mL), and extracted 4 times with water (50 mL). The organic layer was dried over $MgSO_4$, filtered, condensed on a rotary evaporator, and dried en vacuo overnight to yield 1,2-bis (bromoisobutrylyoxy)-2-butene (1.68 g, 85%) as a yellow oil.

Synthesis of ozonolyzable α,ω-bromo-poly(tert-butyl acrylate) (Compound 5)

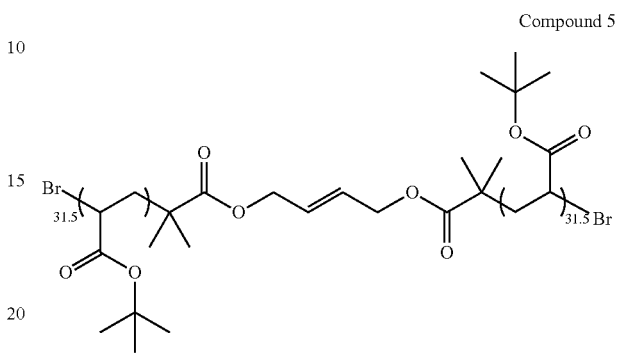

Compound 5

CuBr (418 mg, 2.91 mmol) and Compound 4 (565 mg, 1.46 mmol) were added to a clean, dry round bottom flask, which was subsequently evacuated for 15 m and back-filled with argon. Freshly distilled tert-butyl acrylate (15.0 g, 117 mmol) was added via a degassed syringe followed by degassed toluene (7.5 mL), and PMDETA (489 mg, 2.93 mmol). The reaction flask was immediately submerged in liquid $N_2$ until frozen, evacuated for 15 m, removed from liquid $N_2$, and backfilled with argon. When the mixture thawed completely, the flask was submerged in a 70° C. oil bath and stirred for 1 h under argon atmosphere. After 1 h, the reaction flask was opened to air, and the viscous, black mixture was diluted with tetrahydrofuran (20 mL) and frozen in liquid $N_2$. After thawing, the mixture was passed through a column of neutral alumina, concentrated on a rotary evaporator, precipitated in a 10:1 volume of 50-50 methanol-water three times, dissolved in diethyl ether, dried over $MgSO_4$, filtered, concentrated on a rotary evaporator, and dried in vacuo for 2 d to yield compound I (6.90 g, $M_n$(NMR): 10,600 Da) as a white solid.

Synthesis of MAC 1

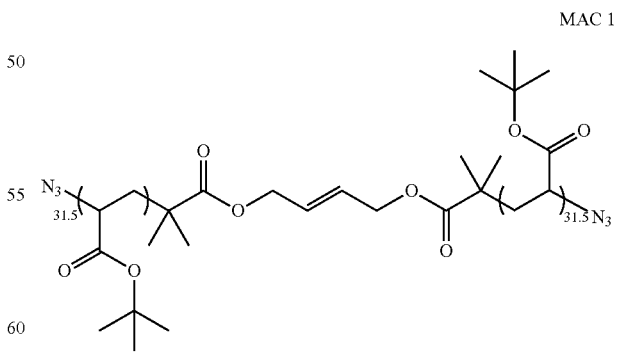

MAC 1

Sodium azide (57.5 mg, 884 mmol) was added to a round-bottom flask containing Compound 5 (3.4 g, 0.402 mmol) dissolved in DMF (100 mL). The reaction mixture was stirred at 50° C. for 1 d after which time it was allowed to cool to room temperature, diluted with ether (50 mL), and extracted 4 times with water (100 mL). The organics were concentrated on a rotary evaporator and precipitated into a 10:1 volume of 50-50 methanol-water. After decanting the methanol-water solution, the remaining solid was dissolved in diethyl ether, dried over MgSO$_4$, filtered, concentrated on a rotary evaporator, and dried for 2 d in vacuo to yield MAC 1 (3.06 g, 90%) as a white solid. The success of the substitution reaction was indicated by the shift of the H NMR resonance of the proton next to the end groups, the appearance of a strong absorbance in the IR spectrum characteristic of alkyl azide, and by elemental analysis, the latter showing the transformation to be complete Typical Procedure for the Crosslinking MACs with CLs to Form MNs 1a and 1b Through CLICK Chemistry

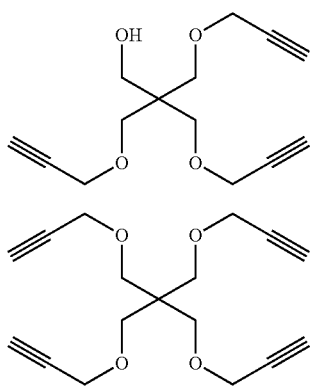

Crosslinkers CLa (410 and 510) and CLb (not Shown in Figures)

MAC 1 (3/2 or 2 equiv. depending on CLa or CLb respectively) was added to a clean vial followed by the copper catalyst (CuBr, CuI, CuSO$_4$, or CuBr(PPh$_3$)$_3$, 10 equiv. to alkyne). The vial was evacuated for 5 minutes and backfilled with argon before degassed solvent (DMF or toluene, 0.5 mL/g of MAC) was added. Sodium ascorbate (4 M in H$_2$O, 20 equiv.) and alkyl amine (PMDETA or DIEA, 10 equiv.) were then added if necessary. The vial was immediately placed in an oven preset to 800° C. and allowed to react for the required time. In most cases) insoluble material formed. However, the appearance of the materials varied from insoluble particulates to stable homogeneous gels depending on the reaction conditions. When the term "homogeneous" is used, it implies that the material was uniform in appearance and that the entire reaction mixture formed a single material. Also, the homogenous materials were mechanically stable, meaning they were able to be handled without breaking apart. When aqueous sodium ascorbate was added to the reaction mixture, a precipitate would form in the region where the water contacted the DMF solution containing MAC 1. These materials are referred to as "slightly more heterogeneous" because at the end of the crosslinking reaction, this region would have a rougher texture. "Heterogeneous" also refers to cases where the reaction mixture formed anything but a single gel (e.g. particulates). In general, the solvent-swollen "heterogeneous" materials would break apart under their own weight. Due to copper catalyst trapped within the networks, all of the materials were colored after the crosslinking reaction, but repeated swelling in fresh acetone yielded colorless materials.

As shown in FIG. 6, the IR spectra of the products (630) closely resembled that of MAC 1 (610) without the azide peak, indicating that the crosslinking proceeded in high yield. For comparison, the spectrum of α,ω-bromo-poly(tert-butyl acrylate) is indicated (600). When no copper catalyst was employed (620), the azide remained, and when a 2:1 ratio of azide to alkyne was used (640), the resulting material still possessed azide functionalities, which could presumably be used for post-crosslinking functionalization of the material. The olefin moiety can also be functionalized after crosslinking, providing another means of tailoring the properties of these materials.

Ozonolysis of MAC 1, MNs 1a and 1b

In order to determine the approximate amount of unreacted material left after CuAAC crosslinking and to confirm that the M$_n$ between crosslinks was well-defined, MNs 1a and 1b were ozonolyzed to yield soluble products. The substrate was dissolved (MAC 1) or swollen (MNs 1a and 1b) in CH$_2$Cl$_2$ (20 mL) in a glass vial. The vial was submerged in an acetone/dry ice bath at −76° C. and allowed to cool for 5 m. O$_3$ was bubbled directly into the system via a glass Pasteur pipette for 20 m until the solution became blue and there were no insoluble materials. After this time, the solution was allowed to warm to room temperature, dried on a rotary evaporator, dissolved in THF, passed through a short alumina plug, and analyzed by SEC.

As shown in FIG. 5, based on the hypothesized network structure for MN 1a (520) (using tri-functional crosslinks (510)), ozonolysis of the olefin moiety present at the midpoints of each junction can yield only four products (530-560) the major of which is a three-armed star polymer (530) with M equaling 1.5 times that of MAC 1 (500).

With reference to the SEC chromatograph shown in FIG. 7, it can be seen that the major degradation product of MN 1a had the expected molecular weight. The ozonolysis product from MAC 1 (730) had a M, approximately one-half that of MAC 1 (720). Similarly, the major degradation product of MN 1a (710) had an M$_n$ approximately equal to twice that of MAC 1, which would be expected for a tetrafunctional MN. However, both networks also possess a peak corresponding to one-half the M$_n$ of MAC 1 (720). Considering that no extraction of soluble material was performed before ozonolysis, this peak must arise from cases in which only one, or neither, of the MAC azides reacted. The sample from MN 1b (700) showed more of this unreacted material, suggesting that the increased steric hindrance of a tetrafunctional network may limit the extent of crosslinking.

7. EXAMPLES OF PREPARATION AND DEGRADATION OF PHOTODEGRADABLE MODEL NETWORK a. Linear Macromonomer The procedure described in above section 5.1 was adapted for the preparation of photodegradable tBA MNs by ATRP synthesis of a photocleavable tBA macromonomer (MAC) from a novel bifunctional nitrobenzyloxycarbonyl (NBOC) initiator (1). SEC characterization of the MN photodegradation products provides evidence that the pore sizes of the parent MN were defined by the number average molecular weight (M$_a$) of the MAC.

Synthesis of MAC 2

The preparation begins with synthesis of the NBOC-ATRP initiator 1, which is capable of photocleavage via the well-known Norrish type II mechanism. (xiii).

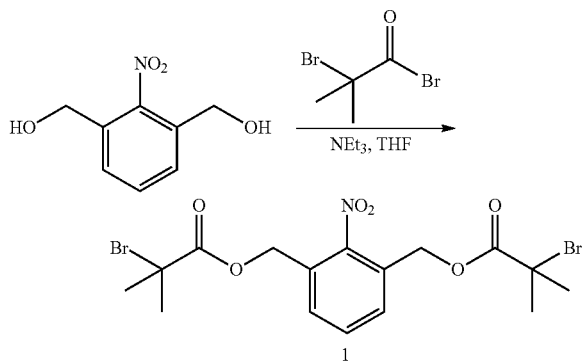

ATRP of tBA from 1 proceeded in a controlled fashion to yield α,ω-bromo-poly(tBA) (ptBA, $M_n$=10,400, PDI=1.16). Treatment of this polymer with sodium azide in DMF yielded MAC 2.

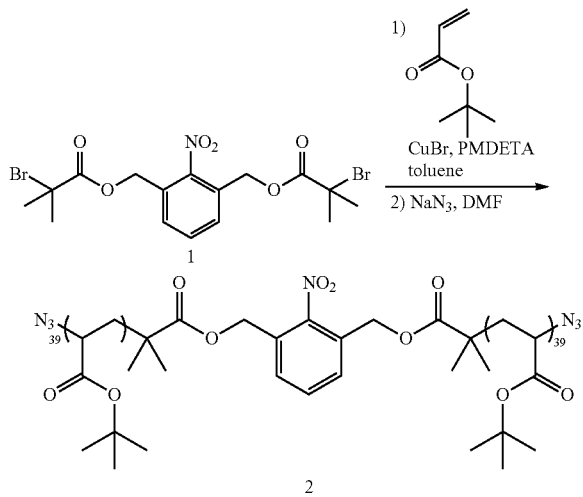

Photocleavage of 2 proceeds quantitatively to yield linear polymers with number average molecular weight ($M_n$) one-half that of 2.

Crosslinking of 2 to Form MNs

Crosslinking of 2 with a tetra-functional acetylene via CuAAC yielded model network 3. The most homogeneous materials formed when CuBr was used as the CuAAC catalyst, in the presence of 2,2'-bipyridyl ligand, and DMF solvent under argon atmosphere. Ultrasonication of this mixture for 15 seconds yielded a viscous solution which was subsequently cured overnight at 40° C. After this time, the materials were repeatedly swollen in fresh 30% H₂O/acetone for 4 d to remove the sol portion and the copper catalyst. The resulting materials were colorless and transparent.

Photodegradation of MNs and SEC of the Degradation Products

Irradiation of THF-swollen 3 with 350 nm light for 30 min yielded a light yellow liquid. After irradiation for two days to ensure complete degradation the THF solution was analyzed by SEC. As shown in FIG. 8, as expected, the primary degradation product 4 (800) was a four arm star polymer, with $M_n$ equal to twice that of 2 (810), indicating that the pore size of the parent MN was defined by the length of 2. A small amount of material having $M_n$ equal to half that of 2 was also observed (820), presumably arising from "dangling chains" (MACs that only reacted on one end) within the network. These remaining functionalities may be later utilized for decoration of the material with functional species. With reference to FIG. 9, the hypothesized molecular structure of 3 (900) and degradation product 4 (910) can be seen.

b. Star Polymer Macromonomer

General

Star Polymer Macromonomer 15 was prepared via a one-pot strategy. The conditions for ATRP and CuAAC are essentially identical, with the important catalytic entity being Cu(I) in both cases. Therefore, a one-pot star polymer synthesis using a small, tetrafunctional azide was used. With reference to FIG. 10, the initiator 13 (1010) has an alkyne separated from the initiation site by an NBOC functionality, thus enabling cleavage of the resulting polymer from the alkyne. Treatment of 13 (1010) with 0.25 equivalents of tetraazide 14 and 200 equivalents of tBA with CuBr catalyst, PMDETA ligand, and 50-50 toluene-DMF solvent yielded star polymer 15 (1020) ($M_n$(SEC)=37,200, PDI=1.11), the result of tandem CuAAC coupling and ATRP (Scheme 6). Conversion of the bromine end groups of 15 (1020) to azides by treatment with NaN₃ in DMF yielded star MAC 17 (1030) (Scheme 6), FIG. 11 shows the ¹H NMR resonances in 17 corresponding to the triazole proton resulting from the CuAAC reaction, the methylene protons from 14 and 13, the aromatic protons of 13, the terminal protons adjacent to the azide groups, and the backbone and tert-butyl protons of ptBA. With reference to FIG. 12, comparison of the FTIR spectra of 15 and 17 confirms the existence of azide groups in 17.

Returning to FIG. 10, CuAAC crosslinking of 17 (1030) with bifunctional alkyne 18 (1040) (under the same conditions used for the linear polymers described above yielded insoluble gel materials 19 (1050). Photodegradation of 19 (1050) yielded linear polymer 20 (1060), with $M_n$ approximately one-half that of MAC 17 (1030) as the primary degradation product. Irradiation of the 90:10 THF:water swollen material for 25 minutes yielded a light yellow liquid and no visible trace of the insoluble material. Continued irradiation for 2 d and SEC analysis yielded product 20 which possessed the expected $M_n$ confirming the presence of tetra-functional branching points in the parent MN. As for the case with the linear MACs, there existed a low molecular weight SEC peak (~10,000 Da) corresponding to unreacted arms of the star MACs.

Synthesis of 2-nitro-3-(tertbutyldimethylsilyloxymethyl)-hydroxymethylbenzene (Compound 9)

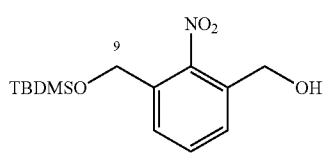

To a clean, dry round-bottom flask was added 2-nitro-1,3-benzenedimethanol (818 mg, 4.47 mmol), anhydrous DMF (40 mL), and imidazole (304.2 mg, 4.47 mmol). The solution was maintained at 0° C. while tert-butyldimethylsilylchloride (337 mg, 2.24 mmol) was slowly added. The resulting pale yellow solution was allowed to warm to room temperature and stirred overnight under argon before being diluted with ethyl acetate (100 mL), washed with water (5×50 mL), dried over MgSO₄, filtered, concentrated on a rotary evaporator, and purified by silica gel chromatography (30% EtOAc:hexanes) to yield 3-(tert-butyldimethylsilyloxymethyl)-2-nitro-hydroxymethylbenzene as a yellow oil which crystallized upon further solvent removal in vacuo. The excess 2-nitro-1, 3-benzenedimethanol was recovered and re-subjected to the reaction conditions to yield Compound 9 in 80% yield after three iterations.

Synthesis of 3-(tert-butyldimethylsilyloxymethyl)-2-nitrobenzoic acid (Compound 10)

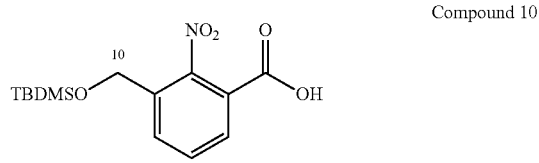 [SMILES: CC(C)(C)[Si](C)(C)OCc1cccc(C(=O)O)c1[N+](=O)[O-]]

Compound 10

An aqueous solution of 15% NaHCO₃ (18 mL) was added to a stirring solution of Compound 9 (1.80 g, 2.69 mmol) in acetone (60 mL) at 0° C. NaBr (133 mg, 1.29 mmol) and TEMPO (18.9 mg, 0.121 mmol) were then added followed by the slow addition of trichloroisocyanuric acid (2.81 g, 12.1 mmol). The resulting solution was allowed to warm to room temperature and stirring for 1 d after which time 2-propanol (3.63 mL) was added. The mixture was filtered over Celite, concentrated on a rotary evaporator, dissolved in 18 mL of saturated Na₂CO₃, washed with EtOAc (3×10 mL), acidified with 1 M HCl, and extracted with ethyl acetate (3×50 mL). The resulting organics were dried over Na₂SO₄, filtered, concentrated on a rotary evaporator and purified by silica gel chromatography (10% MeOH:CH₂Cl₂) to yield Compound 10 (1.05 g, 56%) as a white solid.

Synthesis of 3-(tert-butyldimethylsilyloxymethyl)-2-nitro-N-propargylbenzamide (Compound 10)

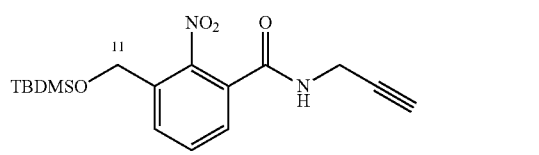

Compound 11

HBTU (183 mg, 0.482 mmol) and HOBt (65.1 mg, 0.482 mmol) were added to a stirring solution of Compound 10 (150 mg, 0.482 mmol) in anhydrous DMF (4.82 mL) followed by N,N-diisopropylethylamine (187 mg, 1.45 mmol) and propargyl amine (79.6 mg, 1.45 mmol). The resulting solution was stirred for 30 h at room temperature after which time 25 mL of EtOAc were added and the solution was washed with water (3×10 mL), aqueous saturated NH₄Cl (1×10 mL), and brine (1×10 mL). The organic layer was dried over MgSO₄, filtered, and concentrated on a rotary evaporator. The resulting oil was purified by silica gel chromatography (50% EtOAc:hexanes) to yield Compound II as a white solid (92.3 mg, 55%).

Synthesis of 3-(2-bromoisobutyryl)methyl-2-nitro-N-propargylbenzamide (Compound 13)

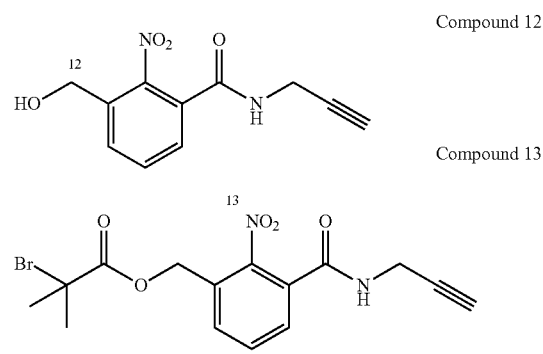

TBAF (4.19 mL of a 1.0 M solution in THF) was added dropwise to a stirring solution of Compound 11 (487 mg, 1.40 mmol) in THF (14 mL), TLC analysis showed complete reaction after 5 minutes, after which time the THF was removed on a rotary evaporator and the resulting oil was dissolved in EtOAc (50 mL), washed with saturated NH₄Cl (2×20 mL), water (2×50 mL), dried over MgSO₄, concentrated in vacuo. The resulting white solid (Compound 12) was dissolved in anhydrous THF (14 mL), triethylamine (184 mg, 1.81 mmol) was added, and the resulting solution was added dropwise to a stirring solution of □-bromoisobutyrylbromide (225 mg, 1.82 mmol) in THF (5 mL) at 0° C. A white precipitate formed immediately. The mixture was allowed to warm to room temperature and stirred overnight under argon atmosphere after which time the solid salts were filtered, and the solvent was removed on a rotary evaporator. The resulting yellow oil was dissolved in ethyl acetate (50 mL) and washed with water (3×20 mL), dried over MgSO₄, concentrated in vacuo, and purified by silica gel chromatography (50% EtOAc:hexanes) to yield Compound 13 (321 mg, 60%) as a white solid.

Synthesis of 4-arm ptBA star polymer (15)

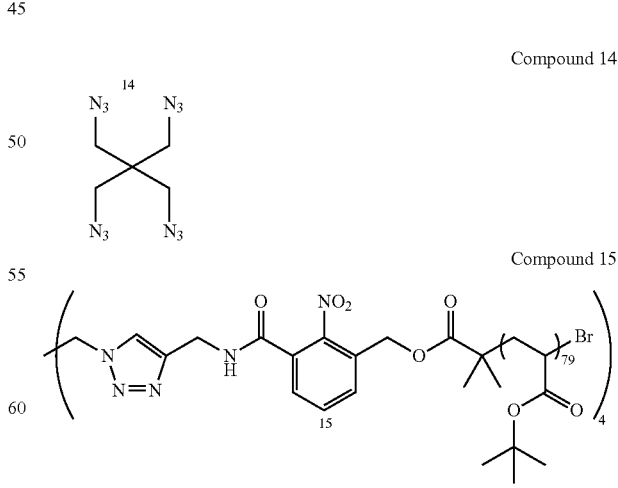

CuBr (115 mg, 0.80 mmol) was added to a clean, dry round bottom flask which was evacuated for 5 minutes before back-filling with argon. Freshly distilled tBA (10.3 g, 80.0 mmol)

and a degassed solution of Compound 14 (23.6 mg, 0.100 mmol) in toluene (2.50 mL) were added via a degassed syringe. A solution of Compound 13 (151 mg, 0.400 mmol) in DMF (2.50 mL) was bubbled with argon for minutes and added to the reaction flask via a degassed syringe. The flask was immediately submerged in liquid $N_2$ until frozen, subjected to vacuum for 10 min, removed from liquid $N_2$ and backfilled with argon. After completely thawing, the light green reaction mixture was submerged in a preheated oil bath at 70° C. and stirred under argon atmosphere for 3.5 h. Samples were taken via a degassed syringe at various time intervals for kinetic analysis by $^1$H NMR. When the reaction had reaction~40% conversion, the flask was opened to air and submerged in liquid nitrogen to quench the reaction. Dilution with THF, passing through a neutral alumina column, concentration on a rotary evaporator, and precipitation (3× in a 10:1 volume of 50-50 methanol-water three times) yielded star polymer 15 as a white solid.

Synthesis of tetra-azido functionalized ptBA star polymer (MAC 17)

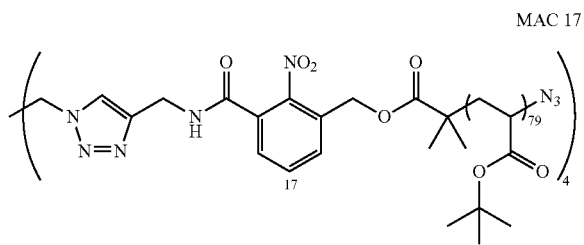

MAC 17

Star polymer MAC 17 was prepared in a manner similar to linear MAC 1 using 4-arm ptBA star polymer 15 as the substrate as opposed to Compound 4.

Synthesis of Bifunctional Alkyne Crosslinker (Compound 18)

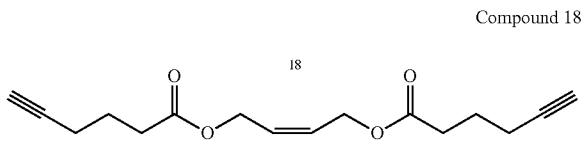 [SMILES: C#CCCCC(=O)OC/C=C\COC(=O)CCCC#C]

Compound 18

Hexynoyl chloride (1.74 g, 13.3 mmol) was added drop-wise to a stirring solution of butane-1,4-diol (0.901 g, 10.2 mmol) and triethylamine (1.35 g, 13.3 mmol) in methylene chloride (25 mL). A white precipitate formed immediately. The mixture was stirred overnight at room temperature after which time it was filtered and concentrated on a rotary evaporator. The residue was dissolved in EtOAc (50 mL) and washed with water (2×25 mL), saturated aqueous $Na_2CO_3$ (2×25 mL), and brine (1×25 mL). The organic layer was dried over $MgSO_4$, filtered, concentrated on a rotary evaporator, and purified by silica gel chromatography (80% hexanes: EtOAc) using anisaldehyde stain to yield Compound 18 as a colorless oil (2.00 g, 70%).

Preparation of Model Network 19

The MAC precursor 17 and CuBr (10 equiv. per azide) were added to a clean glass vial which was capped with a septum and evacuated for 5 min before backfilling with argon. Anhydrous DMF (30% by weight of MAC) was added via a degassed syringe, followed by crosslinker 18 (1 equiv. of alkyne to azide), and PMDETA (20 equiv. per azide). The vial was placed in an ultrasonication bath for 10 s to homogenize the solution before placing the vial in a preheated oven at 60° C. under argon for overnight reaction to yield insoluble MNs which were deep blue in color due to the presence of trapped copper catalyst.

Photodegradation of Model Network 19

The insoluble MN materials were removed from the vials in which they were prepared, and added to a larger vial containing fresh methylene chloride. For 2 d, the solvent was exchanged approximately every 10 hours until the gel materials became colorless. After this time, the methylene chloride was removed and the MN was swollen in 90% THF:water. Excess THF:water was removed with a Pasteur pipette, and the vial containing the swollen material was capped tightly and placed in a rayonet reactor under UV irradiation at 350 nm peak wavelength.

Samples were taken at various times for SEC analysis. Complete degradation of insoluble material was observed after 25 min, but SEC analysis indicated that several days were needed for complete degradation.

8. Example of Substitution of Bromine End Group with Hydroxyl Group

Bromo-terminated p(t-BMA)-b-p(St) with α-hydroxyl end group (Mn=5861, Mw/Mn=1.17, 0.4 g, 58 mmol) and 10 eq. of $Na_2CO_3$ (0.1 g) were placed into 25 mL rbf and degassed and back-filled with argon three times. Degassed DMF (10 mL) was added using a syringe (white suspension—$Na_2CO_3$ was partly dissolved). Then 30 eq. of 4-aminobutanol (300 ηL) was added drop-wise under argon. After stirring for 48 h at room temperature, the α,ω-hydroxyl terminated p(t-BMA)-b-p(St) block copolymer was precipitated into a 10-fold excess of a 50/50 v/v mixture of MeOH/D.I. water. $^1$H NMR (CDCl$_3$): The peak of CH(Ph)—Br at δ=4.4-4.6 ppm disappeared and a new peak of —CH$_2$—OH at δ=3.4-3.6 arised.

9. EXAMPLE OF SUBSTITUTION OF BROMINE END GROUP WITH ACRYLATE GROUP

Bromo-terminated p(t-BMA)-b-p(St) with α-hydroxyl end group is transformed into α,ω-hydroxyl-terminated p(t-BMA)-b-p(St) via the procedure outlined in section 7 above. The product was added to a 100 mL rbf, sealed with a rubber septum, degassed and back-filled with argon three times before dissolving in 20 mL of degassed THF. Then 11 molar excess (with regard to the OH groups) of deoxygenated TEA (306 ηL, 2.24 mmol) was added and the solution was cooled in an ice-bath. A 10 molar excess of acryloyl chloride (162 ηL, 2.04 mmol) was introduced drop-wise and white precipitation appeared. After stirring of the solution for 24 h at room temperature, the resulting macromonomer was precipitated into a 10-fold excess of a 50/50 v/v mixture of MeOH/D.I. water. $^1$H NMR (CDCl$_3$): The peaks of —CH$_2$—OH protons (δ=3.8-3.9 ppm) and —CH$_2$—OCO— protons (δ=4.15-4.3 ppm) disappeared and new peaks of acrylate groups raised: 2× CH$_2$=protons (δ=6.43 and 5.80 ppm), 2× —CH—COO— (δ=6.05 ppm), 3× CH$_2$—OCO— (δ=4.27, 4.36, and 4.43 ppm) and CH(Ph)—NH proton δ=3.90 ppm.

8. REFERENCES i. Flory, P. J. *Principles of Polymer Chemistry*; Cornell Univ. Press: Ithaca, N.Y., 1953; pp 432-493.
ii. Osada, Y.; Ross-Murphy, S. B. *Scientific American* 1993, 268, 82-7.
iii. Kafouris, D.; Themistou, E.; Patrickios, C. S, *Chem. Mater.* 2006, 18, 85-93.
iv. Georgiou, T. K.; Patrickios, C. S. *Macromolecules,* 2006, 39, 1560-1568.
v. Hild, G. *Prog. Polym. Sci.* 1998, 23, 1019-1149.
vi. Hoffman, A. S. *Adv. Drug Deliver Rev.* 2002, 54, 3-12.
vii. Rostovtsev, V. V.; Green, L. G.; Fokin, V, V.; Sharpless, K. B. *Angew. Chem., Int. Ed Engl.* 2002, 41, 2596-2599.
viii. Tornoe, C. W.; Christensen, C.; Meldal, M. *J. Org. Chem.* 2002, 67, 3057-3064.
ix. Kolb, H. C.; Finn, M. G.; Sharpless, K. B. *Angew. Chem., Int d. Engl* 2001, 40, 2004-2021.
x. Calvo-Flores, F. G.; Isac-Garcia, J.; Hernandez-Mateo, F.; Perez-Balderas, F.; Calvo-Asin, J. A.; Sanchez-Vaquero, E.; Santoyo-Gonzalez, F., *Org. Lett.* 2000, 2, (16), 2499-2502.
xi. Korostova, S. E.; Mikhaleva, A. I.; Shevchenko, S. G.; Sobenina, L. N.; Fel'dman, V. D.; Shishov, N. I., *Zhurnal Prikladnot Khimii (Sankt-Peterburg, Russian Federation)* 1990, 63, (1), 234-7.
xii. Diaz, D. D.; Punna, S.; Holzer, P.; McPherson, A. K.; Sharpless, K. B.; Fokin V. V.; Finn, M. G. *J. Polym. Sci., Part A: Polym. Chem.* 2004, 42, 4392-4403
xiii. Bochet, C. G., J. Chem. Soc., Perkin Trans. 1 2002, 125.

The invention claimed is:

1. A method of preparing a linear macromonomer, comprising:
   a) preparing an initiator with at least one terminal halogen group, wherein the initiator contains a degradable linker for each of the terminal halogen groups, the degradable linker selected from the group consisting of a photodegradable linker, an ozonolyzable linker, and a biodegradable linker;
   b) using the initiator, polymerizing a first monomer through ATRP to form a polymeric halide having at least one terminal halogen group;
   c) modifying the polymeric halide through a post-polymerization transformation to replace the terminal halogen groups with desired functional end groups, wherein the desired functional end groups are selected from the group consisting of hydroxyl, acrylate, and azide.

2. The method of claim 1, wherein the monomer functionality is selected from the group consisting of acrylates, methacrylates, styrenics, and polyacids.

3. The method of claim 1, wherein the polymerization step is repeated using a second monomer.

4. The method of claim 1, wherein the post-polymerization transformation to add an azide functional end group comprises treating the polymeric halide with sodium azide in dimethylformamide.

5. The method of claim 1, wherein the post-polymerization transformation is conducted to add an azide functional end group, further comprising the step of modifying the polymeric azide through CLICK chemistry to add a functional end group selected from the group consisting of aldehyde, hydroxy, carboxy, amine, peptide, epoxide, and thiol.

6. A linear macromonomer, prepared by the method comprising:
   a) preparing an initiator with at least one terminal halogen group, wherein the initiator contains a degradable linker for each of the terminal halogen groups, the degradable linker selected from the group consisting of a photodegradable linker, an ozonolyzable linker, and a biodegradable linker;
   b) using the initiator, polymerizing a first monomer through ATRP to form a polymeric halide having at least one terminal halogen group;
   c) modifying the polymeric halide through a post-polymerization transformation to replace the terminal halogen groups with desired functional end groups, wherein the desired functional end groups are selected from the group consisting of hydroxyl, acrylate, and azide.

7. The linear macromonomer of claim 6, wherein the monomer functionality is selected from the group consisting of acrylates, methacrylates, styrenics, and polyacids.

8. The linear macromonomer of claim 6, wherein the polymerization step is repeated using a second monomer.

9. The linear macromonomer of claim 6, wherein the post-polymerization transformation to add a desired azide functional end group comprises treating the polymeric halide with sodium azide in dimethylformamide.

10. The linear macromonomer of claim 6, wherein the post-polymerization transformation is conducted to add an azide functional end group, further comprising the step of modifying the polymeric azide through CLICK chemistry to add a functional end group selected from the group consisting of aldehyde, hydroxy, carboxy, amine, peptide, epoxide, and thiol.

* * * * *